(12) United States Patent
Cao et al.

(10) Patent No.: US 12,567,072 B2
(45) Date of Patent: Mar. 3, 2026

(54) SYSTEMS AND METHODS FOR USE IN BIOMETRIC-ENABLED NETWORK INTERACTIONS

(71) Applicant: MASTERCARD INTERNATIONAL INCORPORATED, Purchase, NY (US)

(72) Inventors: Qing Cao, Purchase, NY (US); Patrik Smets, Begijnendijk (BE); Mohamed Abouelenin, San Carlos, CA (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 793 days.

(21) Appl. No.: 17/495,610

(22) Filed: Oct. 6, 2021

(65) Prior Publication Data

US 2022/0108322 A1 Apr. 7, 2022

Related U.S. Application Data

(60) Provisional application No. 63/088,963, filed on Oct. 7, 2020, provisional application No. 63/139,572, filed on Jan. 20, 2021.

(51) Int. Cl.
*G06Q 20/40* (2012.01)
*G06Q 20/20* (2012.01)
*G06Q 20/22* (2012.01)

(52) U.S. Cl.
CPC ....... *G06Q 20/40145* (2013.01); *G06Q 20/20* (2013.01); *G06Q 20/227* (2013.01); *G06Q 20/405* (2013.01); *G06Q 20/40975* (2013.01)

(58) Field of Classification Search
CPC ............. G06Q 20/40145; G06Q 20/20; G06Q 20/227; G06Q 20/405; G06Q 20/40975; G06Q 20/3821–38215
See application file for complete search history.

(56) References Cited

U.S. PATENT DOCUMENTS 9,519,901 B1 12/2016 Dorogusker
10,373,141 B1 8/2019 Kawan et al.
(Continued)

FOREIGN PATENT DOCUMENTS

WO WO2019/140157 7/2019

*Primary Examiner* — Jay Huang
(74) *Attorney, Agent, or Firm* — Harness, Dickey & Pierce, P.L.C.

(57) ABSTRACT

Systems and methods are provided for facilitating biometric-enabled network interactions. One example computer-implemented method includes receiving, at a biometric identity switch (BIS) computing device, from a point-of-sale (POS) terminal of a merchant, a request for an authorization packet for a transaction between the merchant and a user and identifying a biometric provider associated with a biometric in the request. The method also includes requesting, by the BIS computing device, from the identified biometric provider, a biometric identifier for the user, based on the biometric, receiving the biometric identifier from the identified biometric provider, determining the authorization packet for the user based on the biometric identifier, and transmitting the authorization packet to the POS terminal for use by the POS terminal in compiling an authorization request for the transaction.

9 Claims, 7 Drawing Sheets

(56)          References Cited

U.S. PATENT DOCUMENTS

| | | | |
|---|---|---|---|
| 2003/0105872 A1* | 6/2003 | Han | H04L 63/083 |
| | | | 709/229 |
| 2003/0218534 A1* | 11/2003 | LaCous | G06F 21/32 |
| | | | 380/255 |
| 2005/0203842 A1* | 9/2005 | Sanchez | G06Q 20/12 |
| | | | 705/40 |
| 2005/0234817 A1* | 10/2005 | VanFleet | G06Q 20/108 |
| | | | 705/40 |
| 2008/0040262 A1 | 2/2008 | D. K. et al. | |
| 2014/0201517 A1* | 7/2014 | Corrion | H04L 63/0884 |
| | | | 713/155 |
| 2014/0279425 A1* | 9/2014 | Holman | G06Q 20/10 |
| | | | 705/39 |
| 2015/0073995 A1* | 3/2015 | Hayhow | G06Q 20/4012 |
| | | | 705/71 |
| 2016/0012432 A1* | 1/2016 | Meshkati | G06Q 20/322 |
| | | | 705/44 |
| 2017/0186013 A1* | 6/2017 | Pandya | G06Q 40/00 |
| 2019/0087825 A1 | 3/2019 | Bhatt et al. | |
| 2019/0236592 A1* | 8/2019 | Arora | G06Q 20/3829 |
| 2020/0211023 A1* | 7/2020 | Kaja | G06F 21/32 |
| 2021/0409399 A1* | 12/2021 | Chifor | H04L 67/30 |

* cited by examiner

600

602

Hi User

Activate Biometric Payment

604

YOUR DETAILS

USER NAME　　123-456-7890
Name　　　　　Phone

EMAIL@EMAIL.COM
Email

User Payment Account
XXXX-XXXX-XXXX-XXXX

Blink when you see the orange markers.

606

Hi User

Setup Biometric Payment for:

Merchant 1

Merchant 2

Merchant 3

608

Hi User

Your Biometric Check out Pass is ready

Merchant 1

Expiring 14:27

OK

700

702

SYSTEMS AND METHODS FOR USE IN BIOMETRIC-ENABLED NETWORK INTERACTIONS

CROSS-REFERENCE TO RELATED APPLICATIONS

This application claims the benefit of, and priority to, U.S. Provisional Application No. 63/088,963, filed Oct. 7, 2020, and U.S. Provisional Application No. 63/139,572, filed Jan. 20, 2021. The entire disclosure of each of the above applications is incorporated herein by reference.

FIELD

The present disclosure is generally directed to systems and methods for use in biometric-enabled network interactions.

BACKGROUND

This section provides background information related to the present disclosure which is not necessarily prior art.

Users are known to initiate interactions with parties in various manners. For example, a user (e.g., a consumer, etc.) may present a credit card, or other payment device, to a merchant party, to initiate a payment account transaction to purchase a product or service from the merchant party, whereby the transaction is funded by an account associated with the credit card (or other payment device).

DRAWINGS

The drawings described herein are for illustrative purposes only of selected embodiments and not all possible implementations, and are not intended to limit the scope of the present disclosure.

Figure 1:
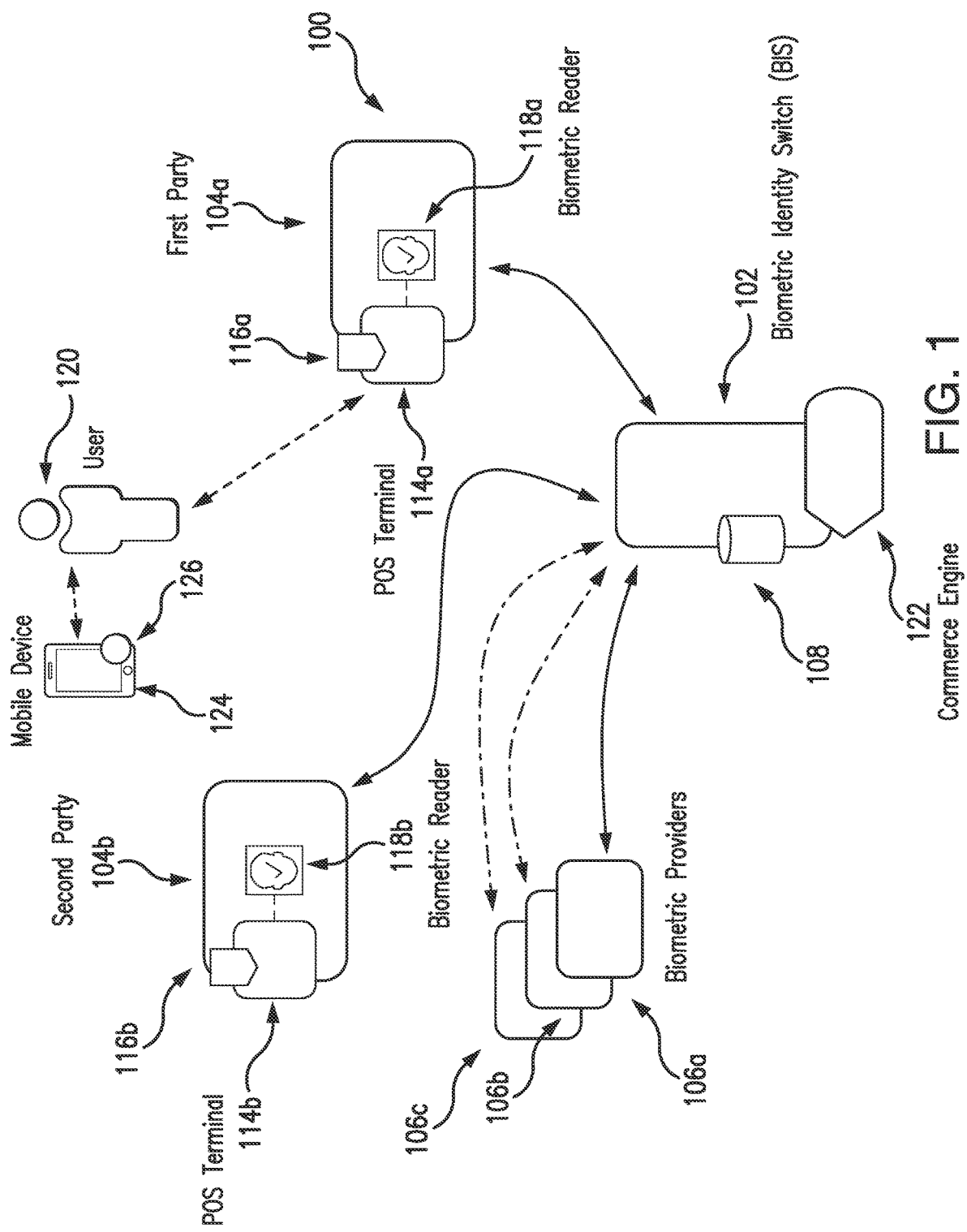
FIG. 1 is an example system of the present disclosure suitable for use in facilitating biometric-enabled network interactions.
Figure 5:
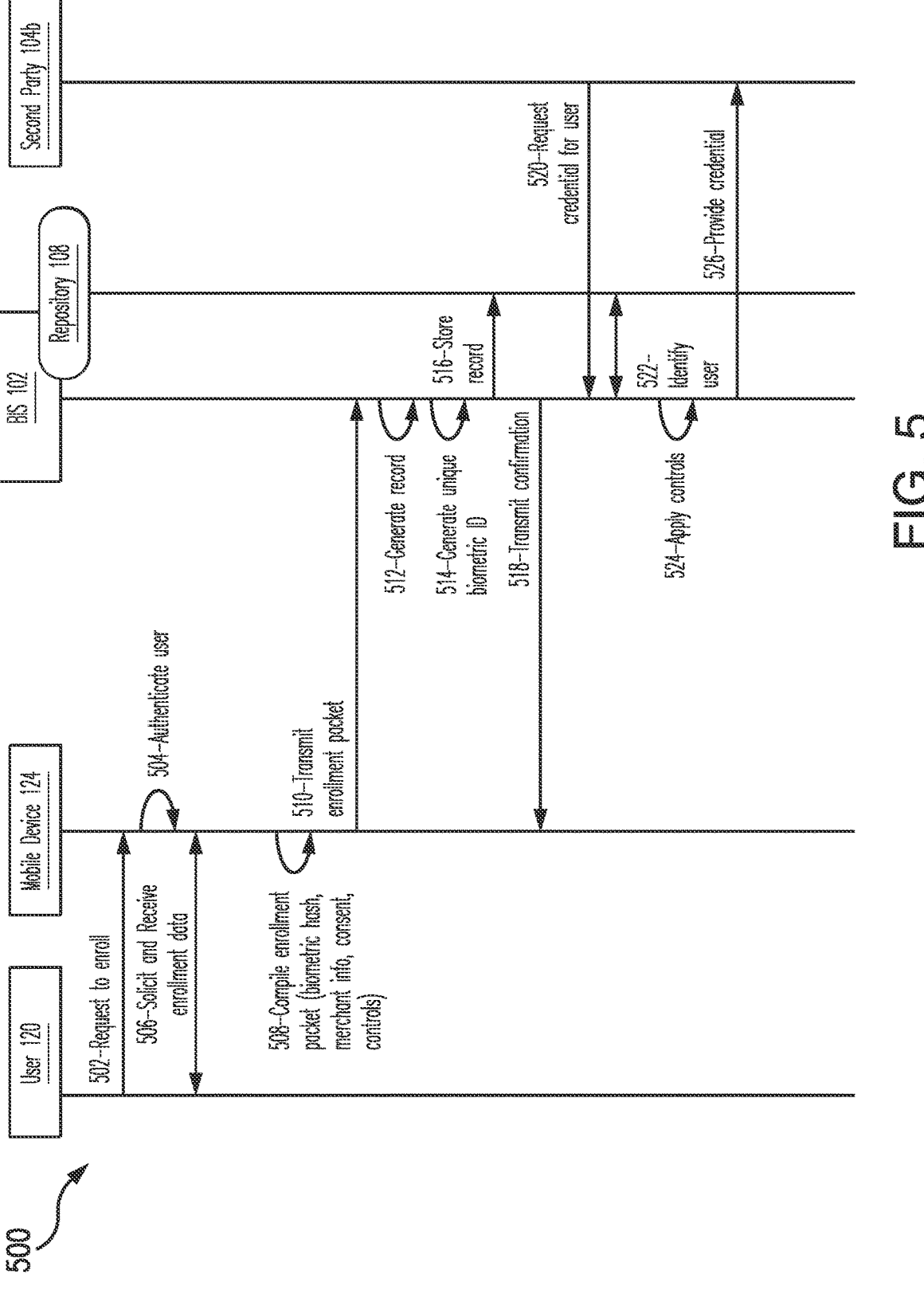

FIG. 5 is an example method, which may be implemented in connection with the system of FIG. 1, for use in enrolling a user in biometric-enabled network interactions, via a mobile device associated with the user; and FIGS. 6A-7B illustrate example interfaces that may be displayed to a user in connection with the method of FIG. 5, as part of enrolling the user in biometric-enabled network interactions via a mobile device associated with the user.

Corresponding reference numerals indicate corresponding parts throughout the several views of the drawings.

DETAILED DESCRIPTION

Example embodiments will now be described more fully with reference to the accompanying drawings. The description and specific examples included herein are intended for purposes of illustration only and are not intended to limit the scope of the present disclosure.

When users interact with merchants (broadly, parties) to purchase products (e.g., good, services, etc.), the users may pay for the products with payment accounts. In doing so, the users present payment cards (or other payment devices), or digital wallets, to deliver credentials associated with the payment accounts to the merchants. These interactions, though, may be cumbersome to both the users and merchants, depending on the number of users purchasing products and the manners of presenting credentials.

Uniquely, the systems and methods herein may provide for enrollment of users for a biometric pay feature in connection with such purchases, by the merchants or by the users themselves (e.g., via mobile devices of the user, etc.), with records of the enrollment for the biometric pay feature being recorded in a central repository and potentially accessible in connection with other interactions (e.g., with the same merchants through which the enrollment was facilitated, with different merchants, etc.), etc. In this manner, the biometric pay feature is extended to various merchants, whether the merchants themselves host the enrollment and implementation of the biometric pay feature (while relying on the central repository), or whether the merchants rely on the users to enroll separately with the central repository hosting the biometric pay feature (e.g., a single enrollment may be levered across multiple different merchants, etc.).

Additionally, or alternatively, the systems and methods herein also uniquely provide for biometric-enabled interactions (e.g., payment account transactions, etc.), for example, for enrolled users, where accounts employed in the interactions are identified based on biometrics of the users associated with the accounts. In particular, when a user initiates a transaction at a merchant, the user presents a biometric (e.g., one or more fingerprints, facial images, etc.) to a biometric reader at the merchant (e.g., coupled to a point-of-sale (POS) terminal, etc.). The biometric reader captures the biometric, processes the biometric (e.g., in a manner specific to the biometric reader, etc.), and then passes the biometric to a biometric identity switch (BIS) (directly or via a POS terminal of the merchant). The BIS determines an associated biometric provider for the biometric (e.g., based on a format, form, or content of the biometric from the biometric reader, or a mapping of the specific party/merchant to a specific biometric provider, etc.) and directs the biometric to the biometric provider, in connection with a request to identify the user. The biometric provider then identifies the user (based on the biometric), and returns a biometric identifier to the BIS. The BIS then obtains an authorization packet for the user and returns this authorization packet to the merchant. In particular, for example, the BIS may identify the user and the transaction to a commerce engine, which, in turn, retrieves and/or compiles payment account credentials for the authorization packet (e.g., consistent with an online or other authorization request, ISO standard requests, etc.). The commerce engine may obtain the payment account credentials, for example, from a cloud wallet that a user has enrolled into in a previous step.

In connection with the above, the BIS may also convert the authorization packet into a format suitable for the merchant (e.g., directly or via a virtual dongle, etc.). Upon receipt of the authorization packet, the merchant, uniquely, is then able to compile the authorization request based on the authorization packet (and consistent with a suitable standard thereby leveraging the existing card-based authorization schemes for a biometric pay interaction) and transmits the authorization request to an issuer of a payment account for the user (or otherwise) for approval (via a payment network, etc.) of the transaction. In this manner, the BIS is permitted to coordinate biometric-enabled interactions, for a number of different types of biometric readers and/or biometric providers, and enable merchants to proceed with limited impact to legacy infrastructure (e.g., POS terminals) in place at the merchants, etc.

FIG. 1 illustrates an example system 100 in which one or more aspects of the present disclosure may be implemented. Although the system 100 is presented in one arrangement, other embodiments may include the parts of the system 100 (or other parts) arranged otherwise depending on, for example, relationships between users and parties, data privacy requirements and/or regulations, etc.

The system 100 generally includes a biometric identity switch (BIS) 102, a first party 104a (e.g., a merchant, another party, etc.), a second party 104b (e.g., a merchant, another party, etc.), multiple biometric providers 106a-c, and a mobile device 124 associated with a user 120, each of which is coupled in communication via one or more networks (e.g., as indicted by the arrowed lines, etc.). The one or more networks may each include one or more of, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof.

In this exemplary embodiment, the BIS 102 is configured to perform the operations related to biometric pay as described herein. The BIS 102 may be a standalone party (e.g., an independent service, etc.), or the BIS 102 may be incorporated into another party, such as, for example, a payment network, a digital identity provider (IDP), a financial institution, or other related or suitable party, etc. In one particular example, the BIS 102 may be incorporated, in whole or in part, in the Mastercard® payment network, etc. As shown in FIG. 1, the BIS 102 includes a central repository (or data structure) 108, which is configured to store biometric identity records, as described more below.

Also in this exemplary embodiment, the first and second parties 104a-b include merchants configured to offer products (e.g., goods, services, etc.) for sale to users and to sell products to users (e.g., to the user 120, etc.). Further, the parties 104a-b, in this example, are physical locations, whereby the users are physically present at the parties 104a-b, when interacting with the parties 104a-b.

The parties 104a-b each include respective point-of-sale (POS) terminals 114a-b, which, among other things, are configured to compile and transmit authorization messages for payment account transactions funding the purchase of products from the parties 104a-b. In particular, for example, for a transaction by the user 120 at the first party 104a, the POS terminal 114a for the first party 104a is configured to compile an authorization request (e.g., an ISO 8583 message, etc.), which includes a merchant ID for the first party 104a, a terminal ID for the POS terminal 114a, a transaction amount, a payment account number (e.g., a primary account number (PAN), etc.) (or token) (broadly, credential) for a funding account of the user 120, an acquirer ID, a date/time, etc., and to then transmit the authorization request to an issuer (not shown) of the user's account, via an acquirer (having the acquirer ID) associated with the first party 104a and a payment network. The authorization request may further include chip data (e.g., based on chip technology for contact and contactless payment as defined by EMVCo (see, e.g., www.emvco.com, etc.), etc.), including a card-originated cryptogram. The issuer is configured to respond with an authorization reply indicating whether the transaction is approved or declined. When approved, the purchase sale is completed with the user 120, and the payment network is configured to clear and settle the transaction between the acquirer and the issuer.

While FIG. 1 includes a POS terminal 114a that is generally disposed at the first party 104a and a POS terminal 114b that is disposed at the second party 104b, for example, one or both of the POS terminals 114a-b may be a mobile POS terminal (at the respective first party 104a and/or second party 104b) or a POS terminal disposed away from the respective first party 104a and/or second party 104b. For example, one or more both of the POS terminals 114a-b may include a mobile POS terminal that includes a smartphone, or other portable communication device, etc. That said, one or both of the POS terminals 114a-b may not be mobile in some embodiments.

In one exemplary embodiment, the POS terminals 114a-b include respective virtual dongles 114a-b, which include computer-executable instructions stored in and/or executable by the POS terminals 114a-b. The virtual dongle 116a, when executed by the POS terminal 114a, for example, configures and/or enables the POS terminal 114a to communicate with the BIS 102 (e.g., to receive data from the BIS 102, to transmit data to the BIS 102, etc.). In this way, the virtual dongle 116a provides added functionality to the POS terminal 114a. For instance, in the system 100, the virtual dongle 116a is able to configure the POS terminal 114a to use data received from the BIS 102 (as described more hereinafter) in connection with generating the authorization request (e.g., consistent with a face-to-face transaction (e.g., an EMV contact/contactless interaction, or an EMV-QR interaction, etc.), etc.), whereby the virtual dongle 116a is configured to compile chip data for inclusion in the authorization request (e.g., for data element (DE) 55 in an ISO 8583 protocol in the case of Mastercard International Incorporated, etc.). In particular, the data received by the virtual dongle 116a, from the BIS 102, includes an authorization packet (including payment account credentials and other data, for example, as received by the BIS 102 from a commerce engine (e.g., commerce engine 122, etc.), etc.). The authorization packet is consistent with an electronic-commerce (e-commerce) (or on-line) interaction or transaction. As such, upon receipt, the BIS 102 (and/or virtual dongle 116a) is configured to convert the data into a format suitable for the first party 104a, for example, data for and compatible with a face-to-face or card-based transaction (e.g., an EMV contact/contactless interaction, or an EMV-QR interaction, etc.).

In connection with the above, the BIS 102 and/or the virtual dongle 116a, for example, may be configured to add data as needed or desired (e.g., to supplement data included in the authorization packet, etc.) in order to provide the authorization request (e.g., data typically included in an EMV contactless transaction but lacking in an e-commerce transaction, etc.). That said, the virtual dongle 116a may be omitted in one or more embodiments, as described herein.

It should be appreciated that the virtual dongle 116b, when executed by the POS terminal 114b, for example, configures and/or enables the POS terminal 114b in the same manner as described herein for the virtual dongle 116a and the POS terminal 114a (without repeating the same for the virtual dongle 116b and the POS terminal 114b).

With continued reference to FIG. 1, the POS terminals 114a-b also include, or in this embodiment are connected to, the respective biometric readers 118a-b (as indicated by the dashed line in FIG. 1). The biometric readers 118a-b may each include, for example, a camera (e.g., a camera device capable of taking a biometric scan of a face, a hand, a finger, etc.), a fingerprint scanner, etc. The biometric readers 118a-b are each configured to capture a biometric of a user (e.g., the user 120, etc.), when prompted by the respective one of the POS terminals 114a-b (e.g., in connection with a transaction by the user 120 or other users at the parties 104a-b, etc.), to then process the captured biometric, through formatting, encryption, etc., and to then return the biometric to the respective one of the POS terminals 114a-b or directly to the BIS 102. It should be appreciated that while each of POS terminals 114a-b is illustrated as being associated with only one of the respective biometric readers 118a-b in FIG. 1, a different number of biometric readers may be employed in other embodiments. In particular, for different parties (or merchants) and/or different POS terminals, the particular biometric reader associated therewith may be different, whereby each biometric reader may process capture biometrics differently. For example, a first type of biometric reader may be configured to perform a proprietary encryption, while a second type of biometric reader may be configured to convert the captured biometric to a standard form or template, etc. Further, while the biometric readers 118a-b are illustrated as separate from the respective POS terminals 114a-b in FIG. 1, it should be appreciated that the biometric readers 118a-b may be included with or integrated with their respective POS terminals 114a-b in other embodiments. For example, a camera input device of a smartphone may be a biometric reader integrated in a mobile POS terminal, consistent with the description herein.

In the system 100, the biometric providers 106a-c are each configured to register, directly or indirectly, users, whereby each of the biometric providers 106a-c is configured to store one or more biometric references for a user and a biometric identifier (ID), or other identifier of the user associated with the biometric reference. In this manner, the biometric providers 106a-c are each configured to receive a biometric from a user (e.g., the user 120, etc.), to match the biometric to a set of biometric references in memory, and to return the biometric ID associated with the matching biometric reference. In connection with the biometric providers 106a-c, the BIS 102, and more specifically, the repository 108, includes one or more entries for each of the biometric providers 106a-c. The entries may include an identification of the specific biometric providers 106a-c, and also a description of the form, format or content of a biometric processed by the biometric providers 106a-c, or a listing or identification of the merchant(s) or party(ies) which is/are associated with each of the biometric providers 106a-c (e.g., that employ biometric readers specific to a given one of the biometric providers, etc.). The entries may include further information regarding the respective biometric providers 106a-c, as desired or necessary for the operations herein, etc. The BIS 102 is configured to use the entries in the repository 108, as described in more detail below.

It should be appreciated that in one or more embodiments, the biometric providers 106a-c may be omitted.

The mobile device 124 in the system 100 is associated with the user 120 and may include any suitable device, which is generally mobile with the user 120 as the user 120 moves from location to location (but this is not required in all embodiments). In this exemplary embodiment, the mobile device 124 is illustrated as a smartphone. However, the mobile device 124 may be a different device (either mobile or not) in other embodiments, including, for example, a laptop computing device, a tablet device, a wearable device (e.g., a smartwatch, fitness tracker, etc.), a smart speaker or other smart home device, etc.

In addition, in this exemplary embodiment, the mobile device 124 includes a mobile application 126 (e.g., a digital identity application, merchant application, bank/financial application, wallet application, biometric application, etc.). In connection therewith, the mobile device 124 is configured, by the application 126, to capture an image of a physical document evidencing the identity of the user 120, to capture a biometric (e.g., a selfie, etc.) of the user 120, to validate the user 120 based on the captured image and biometric, and then to provision the captured image and/or biometric to a digital identity for the user 120 in the mobile device 124 (e.g., in a secure element (SE) of the device 124, etc.). In turn, the digital identity may be presented, at one or more relying parties, as evidence of the user's identity.

Further in the illustrated embodiment, the BIS 102 includes commerce engine 122. The commerce engine 122 is illustrated as part of, or associated with the BIS 102. It should be appreciated that the commerce engine 122 may be a standalone party (e.g., an independent service, etc.), or commerce engine 122 may be incorporated into another party (with or without the BIS 102), such as, for example, a payment network, a digital IDP, a financial institution, or other related or suitable party, etc. In one particular example, the commerce engine 122 (along with the BIS 102) may be incorporated, in whole or in part, in the Mastercard® payment network, etc. In general, the commerce engine 122 is configured to receive an identifier associated with a user (e.g., from the BIS 102, etc.) and to return payment account credentials (e.g., from a cloud wallet for the user 120, etc.) for use in an authorization packet associated with user 120, as described more below.

Finally, as shown in FIG. 1, the system 100 includes user 120. The user 120 is associated with multiple biometrics generally unique to the user 120. The user 120 is associated with a payment account issued by an issuer (not shown), and each of the biometric providers 106a-c includes a biometric reference for the user 120 and an associated biometric identifier (or more generally, an identifier).

In various embodiments, the user 120 may enroll with one or more merchants (e.g., the parties 104a-b, etc.) (and potentially, in connection therewith with one or more of the biometric providers 106a-c), and with the commerce engine 122 to allow for biometric-enabled payment interactions, for example. Additionally, or alternatively, the user 120 may enroll directly with one or more of the biometric providers 106a-c.

As described in more detail below, the user 120, for example, may have the option to enroll via a kiosk in-store at one or more merchants (e.g., at the first party 104a, etc.), or via a remote application (e.g., in the user's mobile device 124, etc.), which may be a merchant application, a wallet application (e.g., associated with a payment network or issuer, etc.), or via a biometric application at the mobile device 124 and associated with one (or more) of the biometric providers 106a-c (e.g., the application 126, etc.). In general, the enrollment may include, for example, biometric enrollment of the user 120, consent by the user 120, and wallet enrollment for payment.

For biometric enrollment, for example, the user 120 may register with the BIS 102, and/or one or more of the biometric providers 106a-c. In connection therewith, a biometric is captured for the user 120 (e.g., at the mobile device 124, a kiosk associated with one of the parties 104a-b including one of the terminals 114a-b, etc.), and transmitted to the appropriate one (or more) of the biometric providers 106a-c, directly or via the BIS 102. Often, the biometric data is transformed into a template and/or encrypted (by the device capturing the biometric data, etc.), prior to being transmitted. Upon receipt of the biometric data, the biometric providers 106a-c are configured to store the biometric data in memory (e.g., as a biometric reference, etc.) and to assign a biometric identifier thereto. As can be appreciated, therefore, the kiosk or the mobile application involved in the biometric enrollment may include an SDK specific to the one or more of the biometric providers 106a-c involved in the enrollment/registration, which configures the mobile device 124, or POS terminal associated with the kiosk, etc., participating in the enrollment, to capture the user's biometric, transform and/or encrypt the biometric, and transmit the biometric to the biometric provider(s). It should be appreciated that such biometric enrollment may additionally or alternatively involve the first party 104a, or the second party 104b, as described herein.

The user 120 may further have the option to complete the wallet enrollment (e.g., cloud-wallet enrollment, etc.), via the kiosk in-store at the one or more parties 104a-b (e.g., via one of the POS terminals 114a-b or other computing device at the kiosk, etc.), or via the remote application (e.g., application 126 at the mobile device 124 (e.g., wallet application, etc.), etc.). In general, as part of the wallet enrollment, the user 120 presents a payment account (e.g., in the form of a card, a token, or a PAN, etc.) to the kiosk and/or the remote application, whereby a wallet profile for the user 120 is compiled and stored by the commerce engine 122 (e.g., potentially, after authentication of the user 120, etc.), and is associated to the biometric identifier by the BIS 102. The wallet profile includes a unique identifier for the user 120 and data associated with his/her payment account.

It should be appreciated that the BIS 102 is configured to correlate the biometric identifier for the user 120 to the unique identifier of the wallet profile, whereby the biometric reference and wallet enrollments are linked. It should further be appreciated that consent of the user 120 may be secured in the biometric enrollment and/or the cloud wallet enrollment processes, as desired. In general, the consent will be related to biometric-enabled interactions, and any associated controls identified for, selected by, set by, etc., the user 120 for the interactions (e.g., merchant controls, account controls, etc.).

Subsequently, in operation in the embodiment of system 100, the BIS 102 is configured to facilitate account interactions based on the enrollments of the user 120 and biometrics received for the user 120 from the first party 104a, for example, to implement a biometric pay feature at the first party 104a.

In particular, when the user 120 requests to pay with a biometric at the first party 104a, as part of an interaction by the user 120 at the first party 104a (e.g., a transaction, etc.), the POS terminal 114a is configured to direct the biometric reader 118a to capture and to return a biometric from the user 120. In turn, the biometric reader 118a is configured to, in response, capture the biometric (e.g., fingerprint, facial image, etc.) and (optionally) process the captured biometric. The processing, when performed, may include encrypting the biometric based on a public, private, or potentially, proprietary encryption/scheme. In one or more implementation, the encrypted biometric, while encrypted, may be recognizable to the type of biometric reader used to capture the biometric based on the format and/or form of the encrypted biometric. In addition (or alternatively), the processing may include mere formatting, templating, and/or size reduction operations, etc. In at least one implementation, the processing of the biometric may be omitted. Then, after processing the biometric, or not, the biometric reader 118a is configured to provide the biometric back to the POS terminal 114a.

The POS terminal 114a is configured to then transmit the biometric to the BIS 102. Alternatively, the biometric reader 118a may be configured to transmit the biometric to the BIS 102, directly. Along with the biometric, the BIS 102 may also receive, from the biometric reader 118a and/or the POS terminal 114a, details associated with the transaction (e.g., amount, date, type of transaction, etc.), details associated with the first party 104a (e.g., merchant ID, etc.), and details associated with the POS terminal 114a (e.g., terminal type, currency code, category code, etc.), etc.

The BIS 102 is configured to then identify a biometric provider (e.g., one of biometric providers 106a-c, etc.) associated with the received biometric and/or a uniform resource locator (URL) (and/or a server address) for the biometric provider (e.g., from multiple URLs associated with the biometric provider where each URL may be associated with a different terminal, merchant, party, group of terminals, group of merchants, group of parties, etc.) associated with the received biometric, based on one or more entries (or mappings) in the repository 108. In one implementation, the entry for each biometric provider identifies each merchant and/or other party from which a biometric is to be received, along with a listing of the biometric provider for the party. Table 1 below illustrates an example data structure that may be included in the repository 108. In such an implementation, the POS terminal 114a, for example, is configured to provide an identifier of the party/merchant and/or a name of the party/merchant and/or an identifier of the terminal (e.g., POS terminal 114a, etc.) (e.g., a terminal ID, etc., to account for different terminals at different merchants and/or parties; etc.) from which the biometric is received, along with the biometric, to the BIS 102. In turn, the BIS 102 is configured to identify one of the biometric providers 106a-c (or associated URL) based on the identifier of the party/merchant/terminal and/or name of the party/merchant/terminal from which the biometric is received.

TABLE 1

| Party | Biometric Provider |
| --- | --- |
| First party 104a | Biometric Provider 106a |
| Merchant A | Biometric Provider 106c |
| Terminal 123456 | URL of Biometric Provider 106b |
| Party X | Biometric Provider 106a |
| Merchant B | Biometric Provider 106a |
| Party Y | Biometric Provider 106b |

In another implementation, the BIS 102 is configured to identify the appropriate biometric provider (e.g., one of biometric providers 106a-c, etc.) (or URL associated therewith) based on the format, form or content of the biometric received from the POS terminal 114a. For example, each of the biometric providers 106a-c may include and/or may be associated with unique encryptions associated particular biometric readers, whereby the biometric received from the biometric reader 118a-b is different in form, format and/or content based on the type of the biometric reader 118a employed at the first party 104a to obtain the biometric. For example, the BIS 102 may include entries in the repository 108 (or other data structure) linking the different format, form or content of the biometric received from the POS terminal 114a to the different biometric providers 106a-c. In this implementation, then, the BIS 102 in turn is configured to match the form, format and/or content of the biometric to a form, format or content associated with a specific one of the biometric providers 106a-c included in one or more entries in the repository 108. In this manner, the BIS 102 is configured to identify one of the biometric providers 106a-c based on the form, format or content of the biometric received from the POS terminal 114a.

Regardless of the implementation, once the appropriate one of the biometric providers 106a-c is identified, the BIS 102 is configured to transmit the biometric to the identified biometric provider, as part of a request for a biometric identifier of the user 120. The identified one of the biometric providers 106a-c is configured to receive the request from the BIS 102, and optionally, to process the biometric. For example, where the biometric is encrypted by the biometric reader 118a, the biometric provider 106a, for example, may be identified and may further be configured to decrypt the biometric, or otherwise process the biometric to provide a biometric suitable for comparison to biometric references included at the biometric provider 106a. The biometric provider 106a is configured to then compare the biometric to one or more of the biometric references stored at the biometric provider 106a. When a match is found, the biometric provider 106a is configured to return a biometric identifier associated with the matching biometric reference to the BIS 102.

In turn, the BIS 102 is configured to access, retrieve, compile, etc., an authorization packet in connection with the interaction, based on the biometric identifier received from the biometric provider 106a. In this example embodiment, the BIS 102 is configured to convert the biometric identifier to a user identifier (e.g., a phone number for the user, a unique identifier, etc.) (e.g., via a mapping included in the BIS 102 and/or the repository 108, etc.) and to submit a request for the payment account credentials for the user 120, as part of (or for use in) an authorization packet, to the commerce engine 122. In turn, the commerce engine 122 is configured to receive the request, to access the cloud wallet profile for the user 120 based on the user identifier (e.g., as stored in memory associated with the commerce engine 122, etc.), and then to retrieve the payment account credentials from the profile and to compile the authorization packet for an e-commerce type transaction. Because the authorization packet is consistent with the e-commerce type transaction, the packet may include various details of the transaction and the merchant (e.g., the first party 104a, etc.), but as a minimum (in this example embodiment) contains the payment account credentials of the user 120 sending the transaction. In particular, for example, the authorization packet may include, without limitation, a cryptogram for the transaction, a PAN for the user's account (from the wallet profile for the user 120), and an expiration date for the PAN (and potentially, a card verification code (CVC) or other suitable code).

It should be appreciated that, in connection with the above, the BIS 102 may be configured to check consent of the user 120 (e.g., acquired in connection with enrollment, etc.), prior to requesting and/or providing the authorization packet for biometric payment at the first party 104a, or even may be configured to seek consent from the user 120 for the particular interaction or transaction. It should also be appreciated that the biometric identifier, rather than the user identifier, may be submitted to the commerce engine 122 in other embodiments, whereby the commerce engine 122 is configured to access the wallet profile and/or compile the authorization packet based on the biometric identifier.

In various embodiments, the commerce engine 122 is configured to provide the payment account credentials for the user 120 as part of the authorization packet to the BIS 102, which, in turn, is configured to convert the authorization packet into a format that is suitable for the POS terminal 114a, for example, and to return the converted authorization packet to the POS terminal 114a. The POS terminal 114a is configured, by the virtual dongle 116a, then, to compile, convert, map, etc., the authorization packet into an authorization request for the interaction that can be transmitted by the POS terminal 114a (e.g., to an acquirer for the first party 104a, etc.). In particular, for example, the POS terminal 114a is configured, by the virtual dongle 116a, to use the received authorization package to generate the authorization request as an in-person authorization request (despite the authorization packet being for an e-commerce type transaction), which includes the content of the authorization packet from the BIS 102 and any additional content required for the POS terminal 114a (e.g., transaction amount, currency code, etc.) to complete the authorization request in a manner consistent with a transaction available at the POS terminal 114a (e.g., as defined by the capabilities of the POS terminal 114a, etc.) (e.g., an EMV contact/contactless transaction, etc.). For example, the chip data may be compiled into DE 55 of the authorization request, while the transaction amount, currency code, PAN, etc., are compiled into other data elements.

More specifically, the virtual dongle 116a is configured to map the authorization packet into the authorization request, whereby the virtual dongle 116a formats the information received in the authorization packet and other terminal information (e.g., for the POS terminal 114a, etc.) into a transaction outcome, for example, as described in EMV Book A, and in particular a First Final Outcome to trigger an online authorization request, as illustrated in Tables 2-5 (see, e.g., www.emvco.com/terms-of-use/?u=wp-content/uploads/documents/EMV-Contactless-Book-A-Architecture-and-General-Rqmts-v2.9-April-2_logoupdate.pdf). By way of this format, a result of the biometric-enabled transaction is compatible with a contactless (or customer initiated QR-code) transaction for various different brands/payment networks. As such, the POS terminal 114a is configured to integrate the data from the authorization packet into the authorization request. The details on this outcome are illustrated in Table 2 (see, again, EMV Book A, etc.) as well in Table 3 (see, e.g., Annex B.5 of EMV Book A, etc.). What's more, the description in "A.1.117 Outcome Parameter Set" of the C-2 kernel specification of EMV Book A may be utilized in generating/formatting the authorization request (e.g., Table 4, etc.). In connection therewith, the kernel specification further describes a content of the (card/payment system specific) data record (e.g., Table 5, etc.). While the above is specific to the kernel specification from Mastercard International Incorporated, it should be appreciated that other kernels from other payment networks may also be used (where such kernels and related data are also published at www.emvco.com).

TABLE 2

| EMV Contactless Book A (6. Outcomes and Parameters) | |
| --- | --- |
| First Final Outcome | POS System Processing |
| Online Request | The POS System advises the cardholder that an online transaction is in progress. An initial message to the cardholder might have been displayed as a result of the kernel including a User Interface Request with the Outcome. If a PIN CVM is required, then the message directs the cardholder to enter the PIN. The terminal initiates an online authorization request, using the data record provided with the Outcome. If the CVM is online PIN, then the terminal processes and submits the encrypted online PIN. The terminal receives the online response or might determine that the request was unable to go online. If the Start parameter was any value other than 'NIA', then: The terminal makes available the transaction disposition in the online response together with all of the EMV TLV data elements present. The reader reactivates Entry Point by continuing with 'Requirements - Online Response - Restart' on page 64. The terminal determines the transaction disposition, based on the online response indication (with Unable To Go Online a decline). If the outcome is Approve or Decline, then: The terminal advises the cardholder of the transaction outcome. If a cardholder receipt is required, the terminal prints it or provides it electronically (e.g., email). The terminal captures CVM signature if requested. The terminal prepares a clearing record if transaction disposition is "approved". Once complete, continue with "Requirements - New Transaction Preparation and Start'" on page 59. |

TABLE 3

| EMV Contactless Book A (Annex B.5: Online Request) The kernel requests online authorization. |
| --- |
| Start: N/A |
| Online Response Data: N/A |
| CVM: Online PIN or Obtain Signature |
| UI Request on Outcome Present: Yes |
| Message Identifier: '1B' ("Authorizing, Please Wait") |
| Status: Card Read Successfully |
| UI Request on Restart Present: No |
| Data Record Present: Yes |
| Discretionary Data Present: Yes or No |
| Alternate Interface Preference: N/A |
| Receipt: Yes or N/A |
| Field Off Request: N/A |
| Removal Timeout: zero |

TABLE 4

| EMV Contactless Book C-2, Annex A (A.1.117 Outcome Parameter Set) | |
| --- | --- |
| Tag: | 'DF8129' |
| Template: | — |
| Length: | 8 |
| Format: | B |
| Update: | K |
| Description: | This data object is used to indicate to the Terminal the outcome of the transaction processing by the Kernel. Its value is an accumulation of results about applicable parts of the transaction. |

| Outcome Parameter Set | | |
| --- | --- | --- |
| Byte 1 | b8-5 | Status |
| | | 0001: APPROVED |
| | | 0010: DECLINED |
| | | 0011: ONLINE REQUEST |
| | | 0100: END APPLICATION |
| | | 0101: SELECT NEXT |
| | | 0110: TRY ANOTHER INTERFACE |

TABLE 4-continued

| EMV Contactless Book C-2, Annex A (A.1.117 Outcome Parameter Set) | | |
| --- | --- | --- |
| | | 0111: TRY AGAIN |
| | | 1111: N/A |
| | | Other values: RFU |
| | b4-1 | Each bit RFU |
| Byte 2 | b8-5 | Start |
| | | 0000: A |
| | | 0001: B |
| | | 0010: C |
| | | 0011: D |
| | | 1111: N/A |
| | | Other values: RFU |
| | b4-1 | Each bit RFU |
| Byte 3 | b8-5 | Online Response Data |
| | | 1111: N/A |
| | | Other values: RFU |
| | b4-1 | Each bit RFU |
| Byte 4 | b8-5 | CVM |
| | | 0000: NO CVM |
| | | 0001: OBTAIN SIGNATURE |
| | | 0010: ONLINE PIN |
| | | 0011: CONFIRMATION CODE VERIFIED |
| | | 1111: N/A |
| | | Other values: RFU |
| | b4-1 | Each bit RFU |
| Byte 5 | b8 | UI Request on Outcome Present |
| | b7 | UI Request on Restart Present |
| | b6 | Data Record Present |
| | b5 | Discretionary Data Present |
| | b4 | Receipt |
| | | 0: N/A |
| | | 1: YES |
| | b3-1 | Each bit RFU |
| Byte 6 | b8-5 | Alternate Interface Preference |
| | | 1111: N/A |
| | | Other values: RFU |
| | b4-1 | Each bit RFU |

TABLE 4-continued

EMV Contactless Book C-2, Annex
A (A.1.117 Outcome Parameter Set)

| Byte7 | b5-1 | Field Off Request |
| | | 11111111: N/A |
| | | Other values: Hold time in units of 100 ms |
| Byte 8 | b8-1 | Removal Timeout in units of 100 ms |

TABLE 5

Data Record Detail for EMV Mode Transaction
Data Object

Amount, Authorized (Numeric)
Amount, Other (Numeric)
Application Cryptogram
Application Expiration Date
Application Interchange Profile
Application Label
Application PAN
Application PAN Sequence Number
Application Preferred Name
Application Transaction Counter
Application Usage Control
Application Version Number (Reader)
Cryptogram Information Data
CVM Results
DF Name
Interface Device Serial Number
Issuer Application Data
Issuer Code Table Index
Payment Account Reference
Terminal Capabilities
Terminal Country Code
Terminal Type
Terminal Verification Results
Track 2 Equivalent Data
Transaction Category Code
Transaction Currency Code
Transaction Date
Transaction Type
Unpredictable Number As shown above, therefore, the data record for the transaction may include, for example, an amount of the transaction, a cryptogram for the transaction, an expiration date for a PAN associated with the user 120, an interchange profile, the PAN, a preferred name, a transaction counter, a usage control, a version number associated with the reader, cryptogram information data, a card-verification-method (CVM) result, a DF name, an interface device serial number, an issuer application data, an issuer code table index, payment account references, terminal capabilities, a terminal country code, a terminal type, a terminal verification result, track 2 equivalent data, a transaction category code, a transaction currency code, a transaction date, and a transaction type, etc. In addition, the virtual dongle 116a may be configured to add data to the authorization request, which is not included in the authorization packet. For example, the virtual dongle 116a may be configured to add a value for an application ID (AID) associated with the interaction (e.g., for the POS terminal 114a, etc.), which is not data associated with an e-commerce transaction and thus not included in the authorization packet. It should be appreciated that the data may be added to the authorization request by the virtual dongle 116a (e.g., related to card verification method, verification results, etc.). The virtual dongle 116a may include generic values for the data, or values indicative of the operations herein. In general, the virtual dongle 116a is configured to ensure that sufficient data is included in the authorization request (for the particular type of authorization request).

In connection with the above, the POS terminal 114a, for example, may be configured to proceed in a specific mode, such as, for example, "card-not-present" (CNP) POS entry mode 10 (e.g., to identify that the transaction is other than a conventional face-to-face transaction, etc.), but may be configured in any other suitable entry mode(s) consistent with the requests and/or the system 100 described herein (e.g., an entry mode specific to the virtual dongle 116a or specific to biometric POS payments, etc.). In this manner, the biometric-enabled interaction described above, while initiated as a certain type of transaction (e.g., a biometric payment transaction, etc.), is emulated, by the virtual dongle 116a, at the POS terminal 114a, as a type of authorization request consistent with the EMV contactless, EMV contact, EMV QR, or other suitable specification for authorization requests (e.g., depending on the capabilities of the POS terminal 114a, etc.).

Once the authorization request is compiled, the POS terminal 114a is configured to transmit the authorization request to the acquirer associated with the first party 104a. The acquirer (not shown in FIG. 1) is configured to forward the authorization request to the payment network associated with the user's account. The payment network (not shown in FIG. 1) is configured to then forward the authorization request to the issuer of the user's payment account. The issuer (not shown in FIG. 1) is configured to determine whether to approve or decline the transaction. In turn, the issuer is configured to compile an authorization reply (indicating the approval or decline) and to transmit the authorization reply to the POS terminal 114a via the payment network and the acquirer. The POS terminal 114a is then configured to display the authorization reply, or at least the approve or decline content, whereby the first party 104a is permitted to continue to deliver the products to the user 120 or to seek alternate payment.

It should be appreciated that while only two parties 104a-b are included in FIG. 1, a different number of parties (e.g., merchants, etc.), each associated with one of the biometric providers 106a-c, may be included in other embodiments. Likewise, a different number of biometric providers may be included in other system embodiments.

In one or more further embodiments, the BIS 102 may be configured to facilitate storage of a biometric pay record, initiated either by the first party 104a (or second party 104b), for example, or the user 120 via the mobile device 124, to implement a biometric pay feature (broadly, enrollment).

In particular, in one example implementation, the user 120 may opt to enroll for biometric pay with the first party 104a while present at the first party 104a. In connection therewith, the user 120 swipes, inserts or otherwise presents a payment device (not shown) to the POS terminal 114a, for example, and further selects to enroll for biometric pay, as an option at the POS terminal 114a. In response, the POS terminal 114a is configured to receive a payment account credential from the payment device, to capture, via the biometric reader 118a, a biometric (e.g., a selfie, a fingerprint, etc.) from the user 120, and to solicit consent and/or controls associated with biometric pay from the user 120, etc. The controls may include a location or region for use of biometric pay (e.g., within fifty miles of my residence, a defined geo-fence, etc.), a temporal control (e.g., an expiration date for such feature, an active time (e.g., activated only for certain times of day, or for certain days, etc.), merchant controls (e.g., available for use at specific merchant only, or merchants to exclude, etc.), etc. The controls may further include notice rules, whereby the user 120 is notified upon attempted/completed biometric pay, etc.

The user 120, in turn, selects the controls as defined, or not, and the POS terminal 114*a* is configured to capture the control selections from the user 120. The POS terminal 114*a* (or other computing device associated with the first party 104*a*) is configured to then store the captured biometric of the user 120 (as a biometric template) along with the user's payment account credential, in a biometric pay data structure, whereby the user 120 is permitted to pay for subsequent transactions at the first party 104*a* by presenting the biometric.

In addition, the POS terminal 114*a* (or other computing device associated with the first party 104*a*) is configured to generate a hash of the biometric (or biometric template) and submit, via an application programing interface (API) (exposed by the BIS 102) the hashed biometric, merchant information about the first party 104*a* (e.g., merchant ID, name, address, etc.), consent and controls for the biometric pay received from the user 120, and also any suitable information about the user 120 (e.g., name, email address, mailing address, phone number, etc.) to the BIS 102. In turn, the BIS 102 is configured to generate a unique biometric ID (e.g., a number, an alphanumeric number, etc.) and store a biometric pay indication associated with the unique biometric ID in the central repository 108. The record includes the hashed biometric, the merchant information, the consent and controls, and the user information, in whole or in part, etc. The BIS 102 is also configured to notify the first party 104*a* of the unique biometric ID for the user 120, for use to retrieve the associated record, for example, in connection with subsequent biometric pay by the user 120.

It should be appreciated that the BIS 102 is configured to operate as above for the second party 104*b* and other merchants, whereby the central repository 108 is populated with records of various users enrolled for biometric pay at various parties/merchants.

Further, subsequently, when a biometric pay is attempted at the second party 104*b*, for example, by the user 120, the second party 104*b* is configured to match a captured biometric (e.g., via the biometric reader 118*b*, etc.) to a biometric template stored in a data structure of the second party 104*b* (as described above). When there is not a match (e.g., the user 120 has not directly enrolled at the second party 104*b*, etc.), the second party 104*b* may be configured to submit the biometric (encrypted) along with the biometric hash and merchant information, via an API (exposed by the BIS 102), to the BIS 102.

In turn, the BIS 102 is configured to search for the biometric hash among the biometric hashes included in the central repository 108. When a match, or sufficient match (within acceptable industry standards), is identified, the BIS 102 is configured to determine a set of possible merchant data structures, in which the user 120 associated with the matched biometric hash may be enrolled. The BIS 102 is further configured to check the consent, policies of the identified parties/merchants (associated with the possible merchant data structures), and the controls from the user 120 associated with the matched biometric hash, and then, when permitted by such policies and/or controls, to pass the encrypted biometric for the user 120 to the identified party (ies)/merchant(s) (e.g., the first party 104*a*, etc.).

The first party 104*a*, for example, is configured to decrypt the biometric and to compare the decrypted biometric to the biometric template included in the data structure of the first party 104*a*, which is associated with the biometric hash matched by the BIS 102. The first party 104*a* is configured to then identify the user 120 to the BIS 102 (and potentially, provide a payment account credential, when permitted by the consent, controls, etc.), and further to destroy or delete the encrypted and decrypted biometric. The BIS 102 is configured to then return the identity of the user 120 to the second party 104*b* (potentially, along with the payment account credential, when permitted by the consent, controls, etc.). The BIS 102 is also configured to then destroy or delete the encrypted biometric.

In this manner, the record included in the repository 108, which is created by one party/merchant, may be used by another party/merchant to identify the user 120, or even, depending on consent, controls and policies, retrieve a payment account credential for the user 120 based on the biometric for the user 120 received from the other party/merchant.

In at least one further implementation, the user 120 may opt to enroll for biometric pay through the application 126 included in the mobile device 124 (as compared to the first party 104*a* or the second party 104*b*). As such, the user 120 may select an option for biometric pay based on a biometric template provisioned to the application 126 (as described above). For instance, a selfie of the user 120 may be selected for biometric pay. In connection therewith, the user 120 also selects controls for the biometric pay, such as, for example, certain parties/merchants for use of biometric pay, a location or region control, a temporal control, etc. As such, the user 120 may enroll, for example, for biometric pay for grocery stores within thirty miles of the user's residence on Sundays between 9 AM and 11 AM for the remainder of the year, etc. In response, the mobile device 124 is configured, by the application 126, to receive the control inputs from the user 120 and to transmit, via an API, the biometric template, a payment account credential for the user 120, and the controls (and consent) to the BIS 102.

The BIS 102 then is configured to generate a biometric pay record, including the biometric template, the payment account credential, and the controls, and store the biometric pay record in the central repository 108.

Thereafter, the second party 104*b*, for example, who has not enrolled the user 120, may submit a captured biometric (via the biometric reader 118*b* of the POS terminal 114*b*) (e.g., encrypted, etc.) for the user 120 opting for biometric pay, to the BIS 102, along with details of the transaction (e.g., merchant ID, amount, time/date, MCC, etc.). The BIS 102 is configured to receive the biometric pay request, to decrypt the biometric, as needed, and to compare the biometric to biometric templates included in the central repository 108. In response to a match, the BIS 102 is configured to determine whether the transaction is consistent with the controls imposed by the user 120. When consistent, the BIS 102 is configured to provide the payment account credential associated with the biometric template to the second party 104*b*, whereby the second party 104*b* is permitted to proceed in initiating a payment account transaction (as described above) for the user 120. When inconsistent, the BIS 102 is configured to return an error notification to the second party 104*b*.

In this manner, the second party 104*b*, in this implementation, is permitted to provide biometric pay services, but without storing the payment account credential and the user's biometric data.

Figure 2:
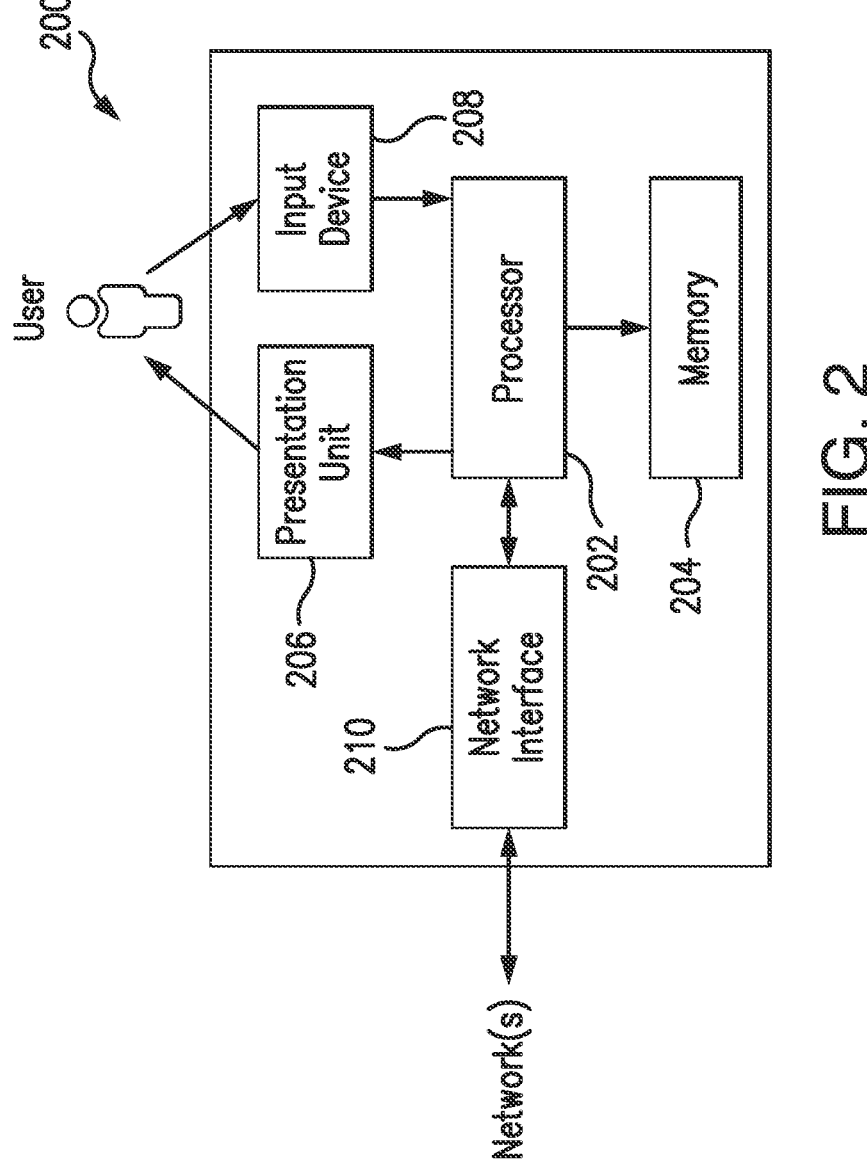
FIG. 2 is a block diagram of an example computing device that may be used in the system of FIG. 1.

FIG. 2 illustrates an example computing device 200 that can be used in the system 100 of FIG. 1. The computing device 200 may include, for example, one or more servers, workstations, personal computers, laptops, tablets, smartphones, virtual devices, etc. In addition, the computing device 200 may include a single computing device, or it may include multiple computing devices located in close proximity or distributed over a geographic region, so long as the computing devices are specifically configured to function as described herein. In the example embodiment of FIG. 1, each of the BIS 102, the parties 104*a-b* (e.g., the POS terminals 114*a-b*, the biometric readers 118*a-b*, etc.), the biometric providers 106*a-c*, the repository 108, the mobile device 124, and the commerce engine 122 may include or may be implemented in a computing device consistent with the computing device 200 (coupled to (and in communication with) the one or more networks of the system 100). However, the system 100 should not be considered to be limited to the computing device 200, as described below, as different computing devices and/or arrangements of computing devices may be used in other embodiments. In addition, different components and/or arrangements of components may be used in other computing devices.

Referring to FIG. 2, the example computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, biometric data (e.g., biometric hashes, biometric templates, etc.), biometric pay records, policies, consents, controls, merchant data structures, and/or other types of data (and/or data structures) suitable for use as described herein.

Furthermore, in various embodiments, computer-executable instructions (e.g., in the form of the application 126 and/or an SDK therein, etc.) may be stored in the memory 204 for execution by the processor 202 to cause the processor 202 to perform one or more of the functions described herein (e.g., one or more of the operations of method 300, one or more of the operations of method 400, one or more of the operations of method 500, etc.), such that the memory 204 is a physical, tangible, and non-transitory computer readable storage media. Such instructions often improve the efficiencies and/or performance of the processor 202 and/or other computer system components configured to perform one or more of the various operations herein, whereby upon performance of the same the computing device 200 may be transformed into a special purpose computer system. It should be appreciated that the memory 204 may include a variety of different memories, each implemented in one or more of the functions or processes described herein.

In the example embodiment, the computing device 200 also includes a presentation unit 206 that is coupled to (and is in communication with) the processor 202 (however, it should be appreciated that the computing device 200 could include output devices other than the presentation unit 206, etc.). The presentation unit 206 outputs information, visually or audibly, for example, to a user of the computing device 200 (e.g., the user 120, etc.) (e.g., solicitations for controls, etc.) whereby the information may be displayed at (or otherwise emitted from) computing device 200, and in particular at presentation unit 206. The presentation unit 206 may include, without limitation, a liquid crystal display (LCD), a light-emitting diode (LED) display, an organic LED (OLED) display, an "electronic ink" display, speakers, etc. In some embodiments, the presentation unit 206 may include multiple devices.

In addition, the computing device 200 includes an input device 208 that receives inputs from the user 120 of the computing device 200 (i.e., user inputs) such as, for example, controls, biometrics, etc., as further described herein. The input device 208 may include a single input device or multiple input devices. The input device 208 is coupled to (and is in communication with) the processor 202 and may include, for example, one or more of a keyboard, a pointing device, a mouse, a camera, a biometric reader, a touch sensitive panel (e.g., a touch pad or a touch screen, etc.), another computing device, and/or an audio input device. In various example embodiments, a touch screen, such as that included in a tablet, a smartphone, or similar device, may behave as both the presentation unit 206 and an input device 208.

Further, the illustrated computing device 200 also includes a network interface 210 coupled to (and in communication with) the processor 202 and the memory 204. The network interface 210 may include, without limitation, a wired network adapter, a wireless network adapter (e.g., a near field communication (NFC) adapter, a Bluetooth adapter, etc.), or other device capable of communicating to one or more different networks herein and/or with other devices described herein. Further, in some example embodiments, the computing device 200 may include the processor 202 and one or more network interfaces incorporated into or with the processor 202.

Figure 3:
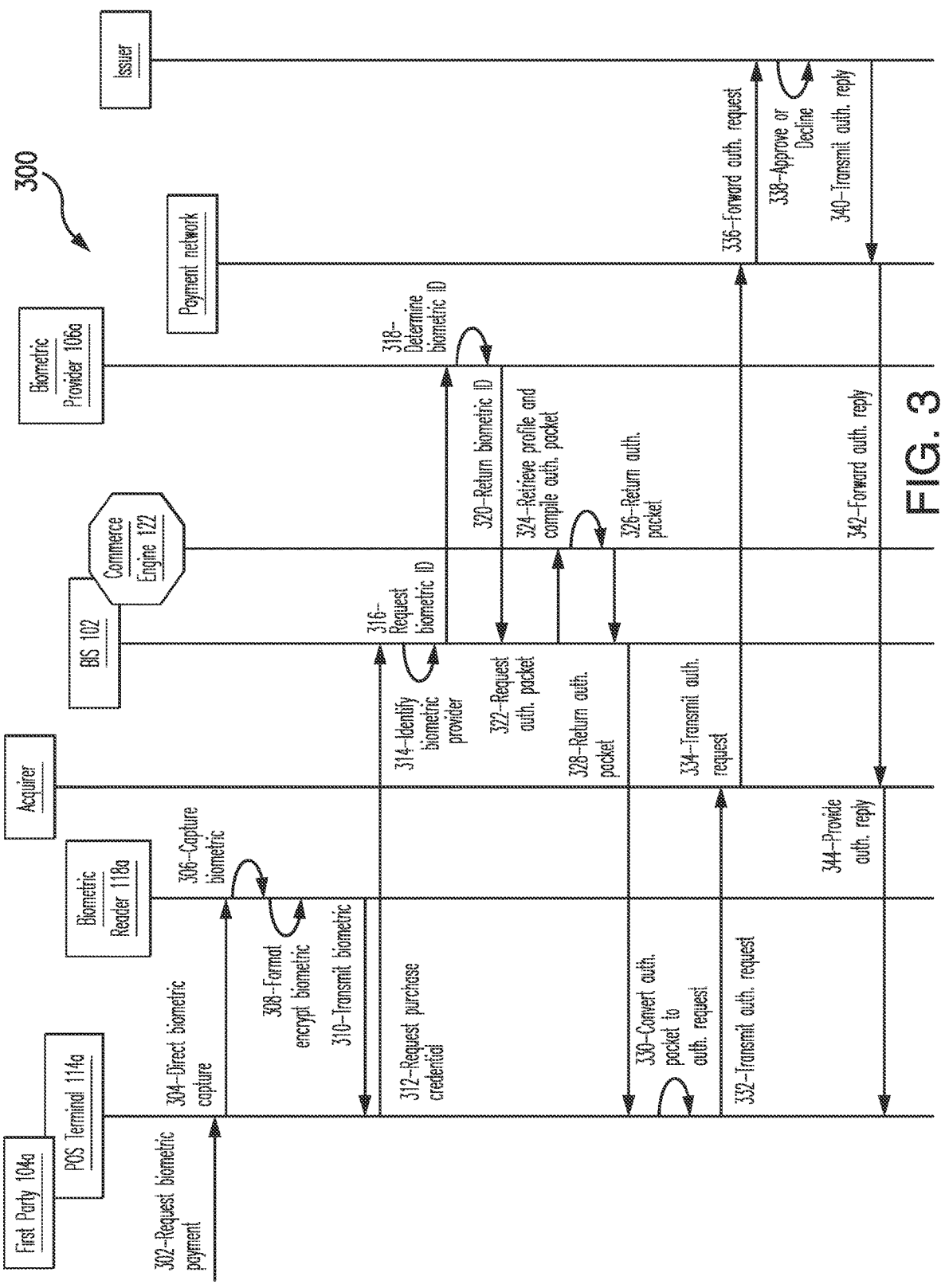
FIG. 3 is an example method, which may be implemented in connection with the system of FIG. 1, for use in facilitating biometric-enabled interactions based on a biometric reader disposed at a party (e.g., at a merchant party, etc.)

FIG. 3 illustrates an example method 300 for use in facilitating a biometric-enabled interaction at a party, based on a biometric reader disposed at the party. The example method 300 is described as implemented in the BIS 102 and the other parts of the system 100, and also with reference to the computing device 200. However, the methods herein should not be understood to be limited to the system 100 or the computing device 200, as the methods may be implemented in other systems and/or computing devices. Likewise, the systems and the computing devices herein should not be understood to be limited to the example method 300.

It should be understood that in the context of method 300, the first party 104*a* is associated with the biometric provider 106*a*, which includes a biometric reference for the user 120. The biometric reference for the user 120 is associated, uniquely, with a biometric identifier. Similarly, the commerce engine 122 includes a profile for the user 120, which includes payment account details for a payment account issued to the user 120 by an issuer shown in FIG. 3.

Initially, at 302, the user 120 request to purchase one or more products from the first party 104*a* through biometric pay, whereby the user 120 presents a biometric to the first party 104*a* in lieu of a payment card, token, wallet, etc. The request may be provided directly to the POS terminal 114*a*, or to a clerk, who then indicates the request to the POS terminal 114. In response, the POS terminal 114*a* directs, at 304, the biometric reader 118*a* to capture a biometric from the user 120. The biometric reader 118*a* then captures, at 306, a biometric from the user 120. The biometric may include, without limitation, a fingerprint, a facial image, a palm print, retina scan, etc. The biometric reader 118a then, optionally, at 308, formats and/or encrypts the biometric, or otherwise processes the biometric.

Thereafter, the biometric reader 118a transmits, at 310, the biometric (i.e., formatted or processed, etc.) to the POS terminal 114a. It should be appreciated that the biometric capture and/or processing may be integrated into the POS terminal 114a when the biometric reader 118a is integrated, in whole or in part, etc. The POS terminal 114a then requests, at 312, a payment account credential from the BIS 102 (broadly, a purchase credential). The request includes the biometric, and may also include an indication of biometric payment. The POS terminal 114a may further include details of the transaction, such as, for example, the amount, category code, currency code, etc., and also details associated with the first party 104a, the POS terminal 114a, the biometric reader 118a, and/or the user 120, etc. (e.g., a name, identifier, model number, etc.).

The BIS 102 identifies, at 314, the biometric provider 106a associated with the biometric included in the request. As explained above, the first party 104a may include one of various different types of biometric readers 118a, which may be associated with one or more of the biometric providers 106a-c (or URLs associated therewith). Consequently, the BIS 102 identifies the biometric provider 106a associated with the biometric, in order to determine an appropriate biometric provider to transmit the biometric. In one example, the BIS 102 identifies the biometric provider 106a (and/or a URL associated therewith), by searching for a name and/or an identifier associated with the first party 104a in a mapping of parties/merchants to biometric providers in the repository 108 (e.g., routing table, etc.). When the name and/or identifier is found, the corresponding biometric provider 106a in the mapping is identified. Alternatively, in another example, the BIS 102 identifies a format, form or content of the biometric received from the POS terminal 114a, and searches for the format, form or content in a mapping between the format, form or content to biometric providers in the repository 108. When the format, form or content of the biometric is found, the corresponding biometric provider 106a in the mapping is identified. In a further example, the POS terminal 114a may identify the corresponding biometric provider 106a to the BIS 102.

In any case, once identified, the BIS 102 requests, at 316, a biometric identifier (or biometric ID) from the identified biometric provider 106a, in this example. The request includes the biometric (or encrypted form thereof). In turn, the biometric provider 106a determines, at 318, the biometric identifier for the biometric, by comparing the biometric (decrypted as needed) to one or more biometric references, each of which corresponds to a biometric identifier included in the biometric provider 106a. When the biometric matches a biometric reference, the biometric provider 106a determines the corresponding biometric identifier is specific to the biometric from the BIS 102. The biometric provider 106a returns the biometric identifier to the BIS 102, at 320.

In response, the BIS 102 requests, at 322, an authorization packet from the commerce engine 122. Prior, in various embodiments, the BIS 102 may determine consent of the user 120 in general for biometric pay (e.g., may determine if consent was provided during enrollment, etc.), or even interact with the user 120 (e.g., via a mobile application at a mobile device, etc.) to solicit consent. The BIS 102 may proceed when the consent is determined. In addition, the BIS 102 may convert the biometric identifier to a user identifier (e.g., a phone number, unique identifier, email address, etc.), based on a mapping of the biometric identifier to the user identifier stored in the repository 108 (or elsewhere). Thereafter, the request to the commerce engine 122 may include the user identifier in lieu of, or in addition to, the biometric identifier. It should be appreciated that the BIS 102 may also provide details associated with the transaction and/or the first party 104a to the commerce engine 122 in connection with the request for the authorization packet.

The commerce engine 122 then retrieves and/or compiles, at 324, the authorization packet based on the user identifier (and/or the biometric identifier), and potentially, the details of the transaction and/or the first party 104a. In one example, the commerce engine 122 compiles a cryptogram for the transaction based on, among other things, the currency and amount of the transaction, etc. The cryptogram, along with a PAN or token for the payment account of the user 120, make up at least part of the authorization packet. Additional data (e.g., as described with reference to the data record above, etc.) may also be included in the authorization packet, as retrieved and/or compiled by the commerce engine 122. The commerce engine 122 returns, at 326, the authorization packet to the BIS 102, which returns the authorization packet to the POS terminal 114a, at 328.

The POS terminal 114a, as configured by the virtual dongle 116a, then, converts the authorization packet into an authorization request, at 330, for the interaction. In particular, for example, the POS terminal 114 fills the data from the authorization packet into the ISO standard authorization request. The authorization request may be specific to the ISO 8583 standard, or otherwise.

Once the authorization request is compiled, the POS terminal 114 transmits, at 332, the authorization request to an acquirer associated with the first party 104a. The acquirer transmits, at 334, the authorization request to the payment network associated with the account. The payment network then forwards, at 336, the authorization request to the issuer of the payment account to the user 120. The issuer determines, at 338, whether to approve or decline the transaction. Regardless of the determination, the issuer compiles and transmits, at 340, an authorization reply for the transaction back to the payment network. The payment network, in turn, forwards, at 342, the authorization reply to the acquirer, which then provides, the authorization reply to the POS terminal 114a, at 344. The first party 104a is then permitted to continue to deliver the products to the user 120, or to seek alternate payment, as appropriate.

Figure 4:
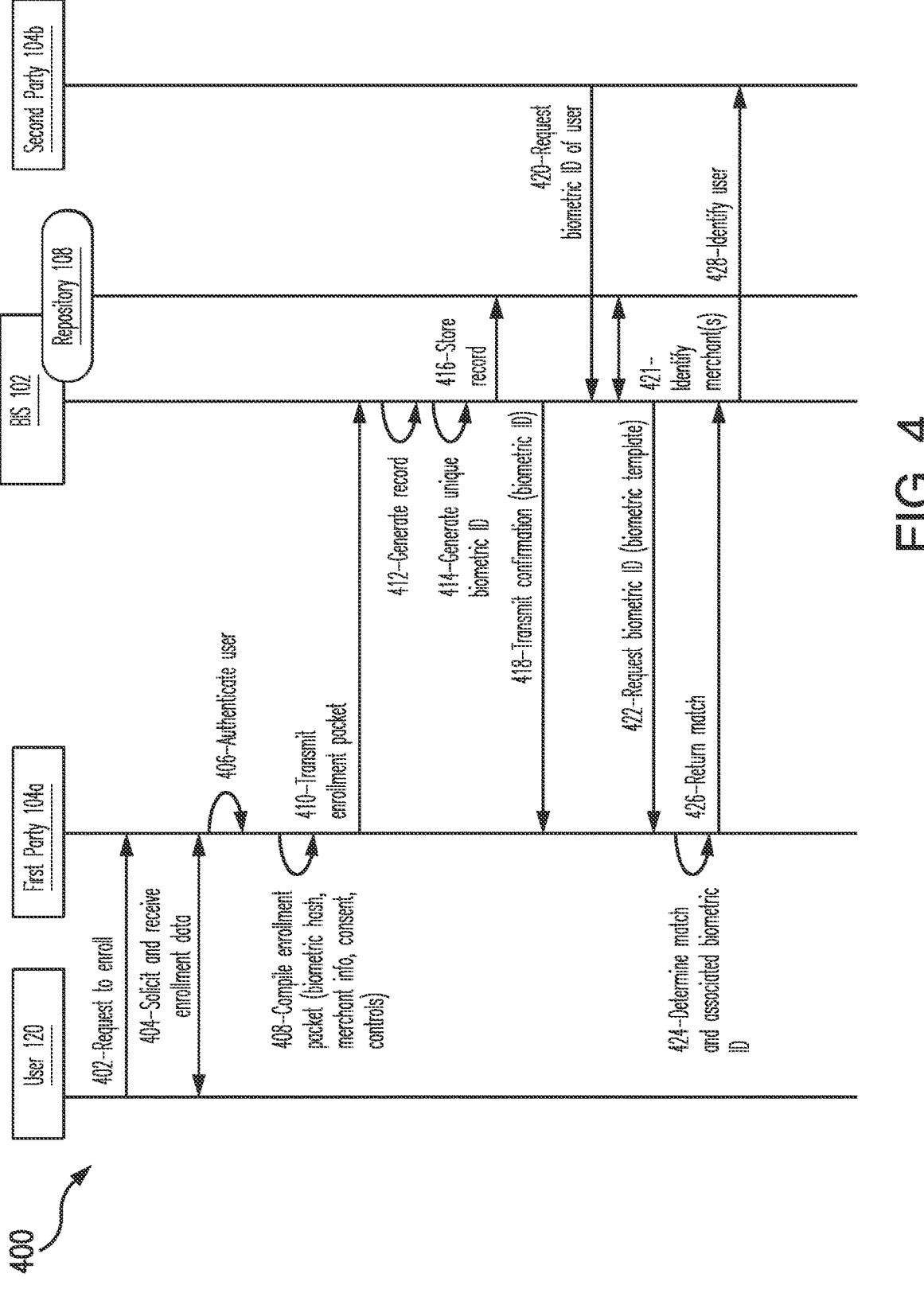
FIG. 4 is an example method, which may be implemented in connection with the system of FIG. 1, for use in enrolling a user for biometric-enabled network interactions, via a party (e.g., a merchant party, etc.)

FIG. 4 illustrates an example method 400 for use in enrolling a user in biometric-enabled network interactions, and specifically, biometric pay. The example method 400 is described as implemented in the BIS 102 and the other parts of the system 100, and also with reference to the computing device 200. However, the methods herein should not be understood to be limited to the system 100 or the computing device 200, as the methods may be implemented in other systems and/or computing devices. Likewise, the systems and the computing devices herein should not be understood to be limited to the example method 400.

Initially in the method 400, the user 120 is present at the first party 104a and requests, at 402, to enroll in biometric pay, whereby the user 120 provides a biometric and is then able to pay with that biometric (at least at the first party 104a) for subsequent transactions. The request may be provided to the POS terminal 114a at the first party 104a, or to another computing device at the first party 104a. In response, the first party 104a (e.g., via the POS terminal 114a, etc.) solicits enrollment data from the user 120, and further receives the enrollment data from the user 120, at 404. The enrollment data generally includes, for example, an image of identity documents for the user 120 (e.g., a driver's license, a passport, etc.), a biometric of the user 120 (e.g., a selfie via the biometric reader 118*a*, etc.), a payment account credential for use in biometric pay, and consent of the user 120 associated with the biometric pay. In addition, the enrollment data may include user controls, such as, for example, temporal controls, location controls, merchant controls, sharing controls, etc. For example, the controls may indicate that biometric pay is only permitted with the first party 104*a* (or parties/merchants in the same category as the first party 104*a*, or other parties/merchants as identified by the user 120, etc.), that biometric pay is only permitted for a limited time (e.g., next 14 days, every Friday between 1 PM and 4 PM, etc.), and/or that biometric pay is only permitted in specific locations or regions (e.g., within a certain number of miles of a residency of the user 120, within certain postal codes, within the country/state/county of the user 120, etc.). The controls may be entered by the user 120 and/or selected by the user 120 from predefined options presented by the POS terminal 114*a*.

In connection therewith, the first party 104*a* authenticates, at 406, the user 120. The authentication may be based on the enrollment data (e.g., comparing the selfie to the image of the user 120 in a driver's license presented by the user 120 during enrollment (as an identify document), etc.), or otherwise. In response, the first party 104*a* stores the biometric as a biometric template and the payment account credential (along with controls and consent) in a data structure of (e.g., memory 204, etc.) of the first party 104*a*.

Next, the first party 104*a* compiles, at 408, an enrollment packet for the user 120, which includes, for example, merchant information about the first party 104*a* (e.g., merchant ID, name, MCC, etc.), a biometric hash of the biometric provided by the user 120 (e.g., of the selfie, etc.), the consent from the user 120 (e.g., consent for biometric pay and/or credential sharing, etc.), controls specified and/or indicated by the user 120, etc. The enrollment packet may further include, in some embodiments, a payment account credential to be used for biometric pay.

The first party 104*a* then transmits, at 410, the enrollment packet to the BIS 102. The enrollment packet may be submitted by an API exposed by the BIS 102, or otherwise.

Upon receipt of the enrollment packet, the BIS 102 generates, at 412, a record for the enrollment, which may include some or all of the data included in the enrollment packet. The BIS 102 then generates, at 414, a unique biometric ID (e.g., including only numbers, including only letters, including a combination of numbers and letters, etc.) (e.g., a number, an alphanumeric number, etc.) for the enrollment (and the specific user 120), and stores, at 416, the record along with the unique biometric ID in the central repository 108. In addition, in one or more embodiments, the BIS 102 may also link the unique biometric ID for the user 120 to other biometric IDs for the user 120 from previously stored records in the central repository 108 (e.g., where the user is enrolled for biometric pay with multiple different parties/merchants, etc.). The BIS 102 then transmits, at 418, a confirmation to the first party 104*a*, which includes the unique biometric ID. The first party 104*a*, in turn, may store the unique biometric ID in the data structure of the first party 104*a*, and linked to the biometric received from the user 120 (as a biometric template) and the user's payment account credential. The first party 104*a* may then access the record, based on the biometric ID received from the BIS 102, to confirm consent and/or apply controls in one or more transactions thereafter.

For instance, the user 120 is permitted to enter the first party 104*a* and to purchase products by presenting the same biometric (e.g., the user's face, etc.) to the first party 104*a* at or around checkout. The first party 104*a* then verifies the biometric against the biometric template stored in the data structure of the first party 104*a* and, when a match is determined, uses the payment account credential from the data structure to fund the transaction.

Further in the method 400, it should be appreciated that the second party 104*b* may also be enrolled to the user 120, as described above, or not, depending on the consent and controls selected by the user 120 during enrollment at the first party 104*a*, etc., (e.g., the user 120 may enroll directly with the second party 104*b* as described above, or the second party 104*b* may be included in the consents and controls selected by the user 120 when registering with the first party 104*a*, etc.). When the second party 104*b* is enrolled, directly, or via another party/merchant (such as through the first party 104*a*), the second party 104*b* may similarly capture a biometric (e.g., selfie, fingerprint, etc.) from the user 120 in connection with a transaction. When the second party 104*b* is unable to match the biometric to biometric data included in a data structure of the second party 104*b* (including biometric and payment account credentials) (e.g., the user 120 is not readily identifiable at the second party 104*b*, etc.), then, the second party 104*b*, as shown in FIG. 4, requests, at 420, biometric identification of the user 120 from the BIS 102. The request may include a biometric hash of the biometric received from the user 120 (or the template thereof), an encrypted biometric for the user 120 (e.g., raw data, the template, etc.), and also merchant information for the second party 104*b*. The request may be submitted by an API exposed by the BIS 102, or otherwise.

In response, the BIS 102 attempts to identify a record matching the biometric hash included in the request, at 421. When a match is identified (e.g., the first party 104*a*, etc.), the BIS 102 requests, at 422, biometric identification from the first party 104*a*, where the request includes the encrypted biometric template for the user 120. The first party 104*a*, in turn, decrypts the biometric template (as needed) and determines, at 424, a match between the biometric template received from the BIS 102 and a biometric template stored in the data structure therein. When there is a match, or a sufficient match, the first party 104*a* (depending on consent and controls provided by the user 120) provides the unique biometric ID (or other indicator of the user 120) to the BIS 102, at 426, thereby returning a match (and whereby the first party 104*a* deletes the biometric template thereafter received from the request). It should be appreciated that the BIS 102, at 422, may request the biometric identification from multiple parties/merchants (whereby multiple matches may be found by the multiple parties/merchants). Further, in at least one embodiment, the first party 104*a* may return a payment account credential with the match, to be provided to the second party 104*b* (again, as permitted by the consent and controls of the user 120).

Next, the BIS 102 determines the identity of the user 120 based on the match(es) from the first party 104*a* (and other parties/merchants), and identifies, at 428, the user 120 to the second party 104*b* (which may include a payment account credential, or not). In this manner, the second party 104*b* is able to identify the user 120, based on the biometric received from the user 120, with the BIS 102, but without knowing about the first party 104*a* or other parties/merchants through which the user 120 is ultimately identified. The second party 104*b* is then permitted to proceed in the interaction with the user 120, based on the identity of the user 120 (as received from the BIS 102), whereby the second party 104*b* locates the payment account credential associated with the user 120 in the data structure (based on the received identity of the user 120, when the user 120 already has a credential on file with the second party 104*b*), or, potentially, uses a payment account credential received from the BIS 102. With that said, it should be appreciated that prior to identifying the user 120 to the second party 104*b* (at 428), the BIS 102 may retrieve the consent and controls for the user 120 (e.g., from the record(s) for the user 120 at the central repository 108, etc.), based on the biometric ID for the user 120, and confirm that the consent and controls are satisfied.

FIG. 5 illustrates another example method 500 for use in enrolling a user in biometric-enabled network interactions, and specifically, biometric pay. The example method 500 is described as implemented in the BIS 102 and the other parts of the system 100, and also with reference to the computing device 200. However, the methods herein should not be understood to be limited to the system 100 or the computing device 200, as the methods may be implemented in other systems and/or computing devices. Likewise, the systems and the computing devices herein should not be understood to be limited to the example method 500.

Initially in the method 500, the user 120 requests, at 502, to enroll in biometric pay with the mobile device 124, and specifically, the application 126 therein. In connection therewith, or prior to or after, the mobile device 124 authenticates, at 504, the user 120.

Next, the mobile device 124 (e.g., via the application 126, etc.) solicits enrollment data from the user 120, and further receives the enrollment data from the user 120, at 506. The enrollment data may include, for example, an image of identity documents for the user 120 (e.g., a driver's license, a passport, etc.), a biometric of the user 120 (e.g., a selfie via the biometric reader 118*a*, etc.), a payment account credential for use in biometric pay, and consent of the user 120 associated with the biometric pay. In addition, the enrollment data may include user controls, such as, for example, temporal controls, location controls, merchant controls, sharing controls, etc. In connection therewith, the controls, if any, may be entered and/or selected by the user 120, as presented by application 126 and/or the mobile device 124 (again as described above with reference to method 400 of FIG. 4).

Figures 6A, 6B, 6C, 6D:
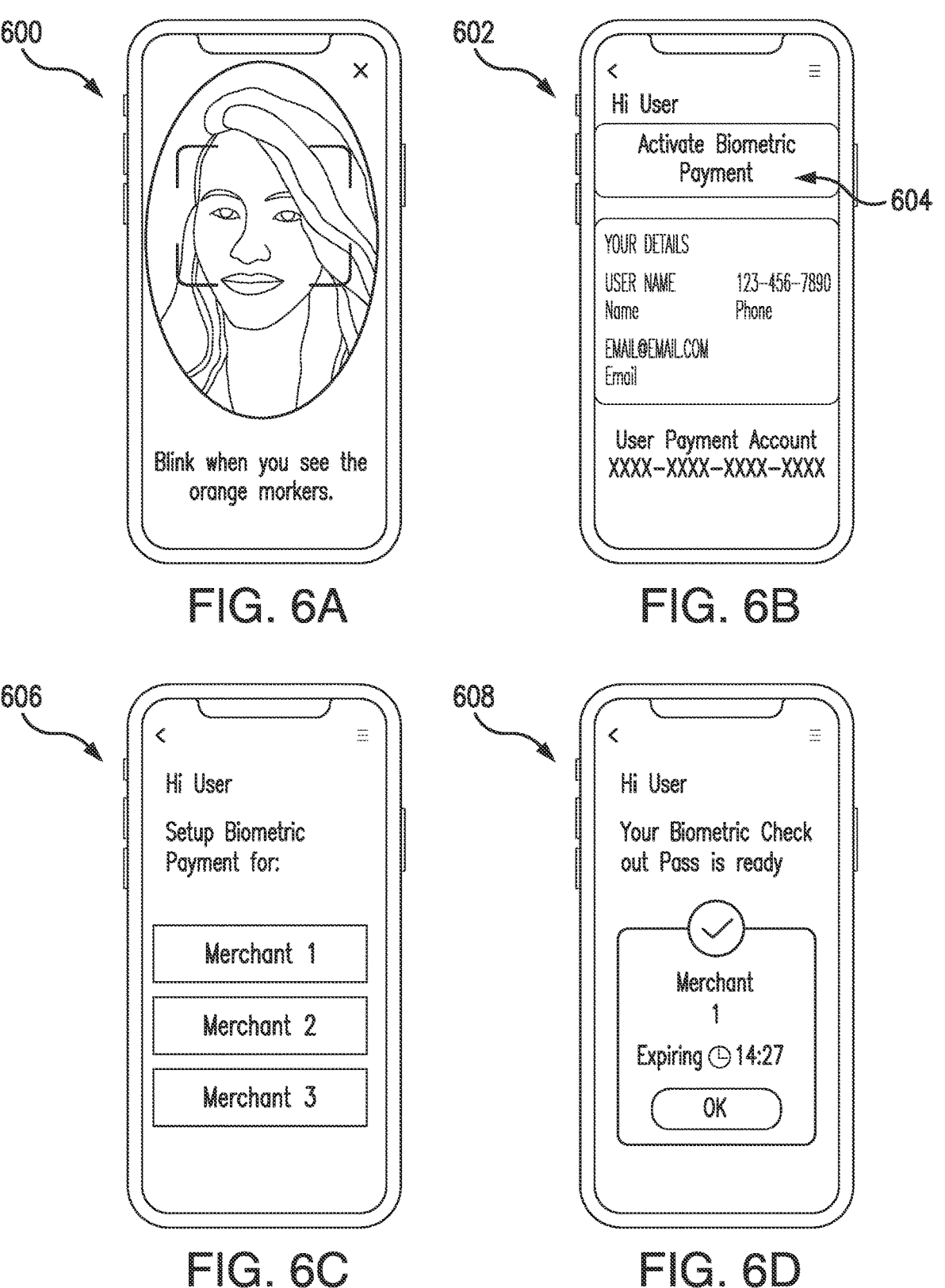

FIGS. 6A and 6B illustrate example interfaces 600, 602 that may be displayed to the user 120 at the mobile device 124 in connection with soliciting such enrollment data from the user 120 (at 506 in the method 500). In particular, the mobile device 124 (as caused by the application 126, etc.) may display the interface 600 to the user 120 to capture a selfie biometric of the user 120. Then, once the selfie biometric of the user 120 is captured, the mobile device 124 (as caused by the application 126, etc.) may display the interface 602 to the user 120 to request (and to receive) a name of the user 120, a phone number of the use 120, an email address of the user 120, and a payment account credential of the user 120 (e.g., from a virtual wallet at the mobile device, as entered by the user 120, etc.). Once the requested data is provided by the user 120, the user 120 may then select option 604 to activate biometric payment (e.g., provide permission for enrollment, etc.).

Then in the method 500, the mobile device 124 compiles, at 508, an enrollment packet for the user 120, which includes, for example, a biometric hash of a biometric provided by the user 120 (e.g., a selfie, etc.), consent from the user 120 (e.g., consent for biometric pay and/or credential sharing), controls specified and/or indicated by the user

120, and a payment account credential to be used for biometric pay. The mobile device 124 then transmits, at 510, the enrollment packet to the BIS 102. The enrollment packet may be submitted by an API exposed by the BIS 102, or otherwise.

Upon receipt of the enrollment packet, the BIS 102 generates, at 512, a record for the enrollment, which may include some or all of the data included in the enrollment packet. The BIS 102 then generates, at 514, a unique biometric ID for the enrollment (and the specific user 120), and stores, at 516, the record along with the unique biometric ID in the repository 108 (in associated with suitable information (e.g., payment credential or associated identifier (e.g., wallet identifier, etc.), etc.)). The BIS 102 then transmits, at 518, a confirmation to the mobile device 124 (e.g., to the application 126, etc.), which may include the unique biometric ID.

FIGS. 6C and 6D illustrate example interfaces 606, 608 that may be displayed to the user 120 at the mobile device 124 in connection with confirming to the user 120 that the user 120 is enrolled for biometric payments (at 518 in the method 500). In particular, the mobile device 124 (as caused by the application 126, etc.) may display the interface 606 to the user 120 illustrating available merchants that accept biometric payment (e.g., based on one or more controls provided by the user 120 during enrollment, etc.). The user 120 may then select one of the merchants in order to proceed with a biometric transaction at the merchant (as described next in the method 500, in connection with operations 520-526). And, in response to the selection, the mobile device 124 (as caused by the application 126, etc.) may display the interface 608 to the user 120 with a confirmation that biometric payment is active for the selected merchant (e.g., Merchant 1, etc.), for a particular interval (in this example).

Thereafter, the user 120 is permitted to enter various enrolled parties/merchants, including the second party 104*b* (e.g., Merchant 1 as selected in the interface 606 of FIG. 6C, etc.), and to perform a transaction through biometric pay. Specifically, the user 120 walks into the location of the second party 104*b* and selects one or more products to purchase, and then presents a biometric to the second party 104*b* (e.g., at the biometric reader 118*b* of the POS terminal 114*b*, etc.). In response, the second party 104*b* captures the biometric of the user 120 and requests, at 520, a payment account credential based on the biometric (raw or template) from the BIS 102 (because the second party 104*b* does not have a stored biometric for the user 120 (even though the second party 104*b* may have an account or other record for the user 120, etc.)). As above, the request may be submitted by an API exposed by the BIS 102, or otherwise.

In response, the BIS 102 identifies a record matching the biometric included in the request, at 522. Next, the BIS 102 applies the controls of the user 120 (as defined above), at 524, to the transaction. As above, the controls may limit the time, location, party/merchant, etc., included in the transaction for which biometric pay may be used. When the controls are applied, and the transaction is permitted, the BIS 102 retrieves the payment account credential based on biometric identifier (e.g., retrieve wallet identifier, etc.) and then provides, at 526, the payment account credential to the second party 104*b* (e.g., from the commerce engine 122, etc.), thereby permitting the second party 104*b* to proceed in the interaction with the user 120 and use the payment account credential to initiate a transaction as described above.

Figures 7A, 7B:
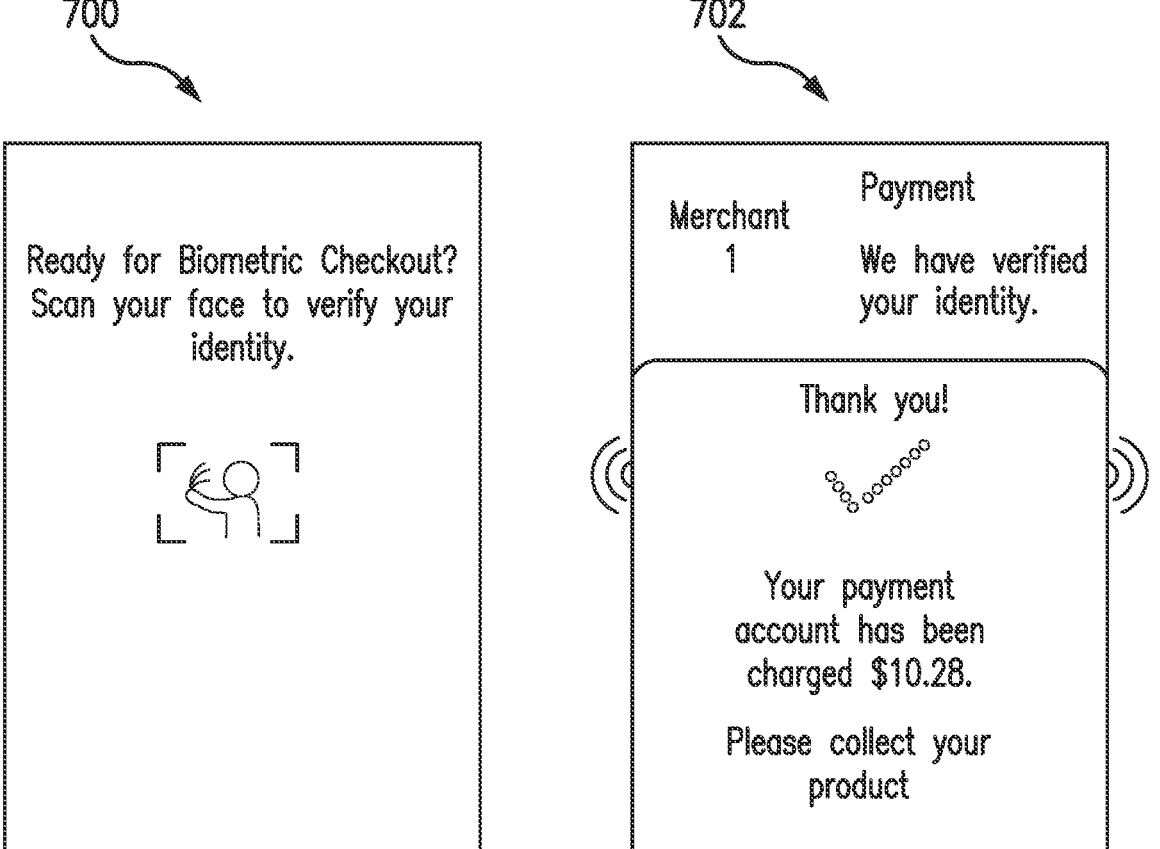

FIGS. 7A and 7B illustrate example interfaces 700, 702 that may be displayed to the user 120 at the POS terminal 114*b*, for example, in connection with purchasing a product from the second party 104*b* (e.g., Merchant 1 in interfaces 700, 702, etc.). In particular, as part of the user 120 checking out (as part of purchasing a product), the user 120 may select at the POS terminal 114*b* to purchase the product via biometric payment. In response, the POS terminal 114*b* may display the interface 700 to the user 120 requesting initiation of biometric payment, by the user 120 presenting a facial image to the POS terminal 114*b* (e.g., to the biometric reader 118*b* associated therewith, etc.). And then, in response to the BIS 102 identifying a record matching the user's facial image, the POS terminal 114*b* may display the interface 702 to the user 120 with a confirmation of successful payment for the selected product.

EMBODIMENTS

For further illustration, and without limitation, additional embodiments of the present disclosure are set forth below.

Embodiment 1 is directed to a non-transitory computer-readable storage medium comprising executable instructions, which when executed by at least one processor of a biometric identity switch (BIS) computing device, cause the at least one processor to: (a) receive, from a point-of-sale (POS) terminal of a merchant, a request for an authorization packet for a transaction between the merchant and a user, the request including a biometric of the user; (b) identify a biometric provider associated with the biometric; (c) request, from the identified biometric provider, a biometric identifier for the user, based on the biometric; (d) receive the biometric identifier from the identified biometric provider; (e) determine the authorization packet for the user based on the biometric identifier; and (f) transmit the authorization packet to the POS terminal for use by the POS terminal in compiling an authorization request for the transaction.

Embodiment 2 is the non-transitory computer-readable storage medium of Embodiment 1, wherein the executable instructions, when executed by the at least one processor to identify the biometric provider, cause the at least one processor to: look up the biometric provider for the merchant, based on a name and/or an identifier for the merchant included in the request; or identifying a form, format and/or content of the biometric to the biometric provider.

Embodiment 3 is the non-transitory computer-readable storage medium of Embodiments 1 or 2, wherein the request further includes details associated with the transaction and/or the merchant.

Embodiment 4 is the non-transitory computer-readable storage medium of any one of Embodiments 1-3, wherein the executable instructions, when executed by the at least one processor to determine the authorization packet, cause the at least one processor to: convert the biometric identifier to a user identifier; submit a packet request to a commerce engine computing device for the authorization packet, the packet request including the user identifier and the details associated with the transaction and/or the merchant; and in response to the packet request, receive the authorization packet from the commerce engine computing device.

Embodiment 5 is the non-transitory computer-readable storage medium of any one of Embodiments 1-4, wherein the authorization packet includes at least: a PAN for a payment account of the user, an expiration date for the PAN for the payment account of the user, and a cryptogram specific to the transaction.

Embodiment 6 is the non-transitory computer-readable storage medium of any one of Embodiments 1-5, wherein the biometric includes a fingerprint or a facial image of the user.

Embodiment 7 is the non-transitory computer-readable storage medium of any one of Embodiments 1-6, wherein the executable instructions, when executed by the at least one processor, further cause that at least one processor to at least partially convert the authorization packet into a card-based authorization format prior to transmitting the authorization packet to the POS terminal.

Embodiment 8 is the non-transitory computer-readable storage medium of any one of Embodiments 1-7, wherein the executable instructions, when executed by the at least one processor, further cause that at least one processor, prior to receiving the request for the authorization packet from the POS terminal, to: receive an enrollment packet for the user, the enrollment packet including biometric data associated with the user and one or more controls associated with use of the biometric data; generate an enrollment record for the enrollment packet, the generated enrollment record including at least part of the biometric data and the one or more controls associated with use of the biometric data; and store the generated enrollment record in a repository, and linking the enrollment record to the biometric identifier.

Embodiment 9 is the non-transitory computer-readable storage medium of Embodiment 8, wherein the merchant is a first merchant, and wherein the executable instructions, when executed by the at least one processor to receive the enrollment packet for the user, cause the at least one processor to receive the enrollment packet for the user from a second merchant different than the first merchant.

Embodiment 10 is the non-transitory computer-readable storage medium of Embodiment 8, wherein the executable instructions, when executed by the at least one processor to receive the enrollment packet for the user, causes the at least one processor to receive the enrollment packet for the user from a mobile device of the user.

Embodiment 11 is the non-transitory computer-readable storage medium of any one of Embodiments 8-10, wherein the executable instructions, when executed by the at least one processor, cause the at least one processor to apply the one or more controls associated with use of the biometric data prior to determining the authorization packet for the user.

Embodiment 12 is directed to a system for use in biometric-enabled network interactions, the system comprising at least one processor associated with a point-of-sale (POS) terminal, wherein the at least one processor is configured to: (a) request a payment account credential from a biometric identity switch (BIS) for use in an interaction between a user and a merchant; (b) receive an authorization packet indicative of an on-line transaction, the authorization packet include the payment account credential; (c) convert the authorization packet into an authorization request for the interaction, the authorization request associated with an in-person transaction; and (d) transmit the authorization request to an acquirer associated with the merchant.

Embodiment 13 is the system of Embodiment 12, wherein the at least one processor is further configured, in response to the interaction between the user and the merchant and prior to requesting the payment account credential from the BIS, to solicit a biometric from the user; and wherein the at least one processor is configured, in order to request the payment account credent from the BIS, to transmit a request for the payment account credential to the BIS, wherein the request includes the biometric of the user.

Embodiment 14 is the system of Embodiments 12 or 13, wherein the biometric includes a fingerprint or a facial image of the user.

Embodiment 15 is the system of any one of Embodiments 12-14, wherein the at least one processor is further configured to receive an authorization reply from an issuer of an account associated with the payment account credential, in response to the authorization request.

Embodiment 16 is the system of any one of Embodiments 12-15, wherein the at least one processor is configured, in order to convert the authorization packet into the authorization request for the interaction, to map data included in the authorization packet to one or more data elements of the authorization request.

Embodiment 17 is directed to a non-transitory computer-readable storage medium comprising executable instructions, which when executed by at least one processor of a point-of-sale (POS) device, cause the at least one processor to: (a) request a payment account credential from a biometric identity switch (BIS) for use in an interaction between a user and a merchant; (b) receive an authorization packet indicative of an on-line transaction, the authorization packet include the payment account credential; (c) convert the authorization packet into an authorization request for the interaction, the authorization request associated with an in-person transaction; and (d) transmit the authorization request to an acquirer associated with the merchant.

Embodiment 18 is the non-transitory computer-readable storage medium of Embodiment 17, wherein the executable instructions, when executed by the at least one processor, further cause the at least one processor, in response to the interaction between the user and the merchant and prior to requesting the payment account credential from the BIS, to solicit a biometric from the user; and wherein the executable instructions, when executed by the at least one processor to request the payment account credent from the BIS, cause the at least one processor to transmit a request for the payment account credential to the BIS, wherein the request includes the biometric of the user.

Embodiment 19 is the non-transitory computer-readable storage medium of Embodiments 17 or 18, wherein the biometric includes a fingerprint or a facial image of the user.

Embodiment 20 is the non-transitory computer-readable storage medium of any one of Embodiments 17-19, wherein the executable instructions, when executed by the at least one processor, further cause the at least one processor to receive an authorization reply from an issuer of an account associated with the payment account credential, in response to the authorization request.

Embodiment 21 is the non-transitory computer-readable storage medium of any one of Embodiments 17-20, wherein the executable instructions, when executed by the at least one processor to convert the authorization packet into the authorization request for the interaction, cause the at least one processor to map data included in the authorization packet to one or more data elements of the authorization request.

Embodiment 22 is directed to a non-transitory computer-readable storage medium comprising executable instructions, which when executed by at least one processor of a POS terminal, cause the at least one processor to: receive an authorization packet indicative of an on-line transaction; map the authorization packet into an authorization request associated with an in-person transaction; and transmit the authorization request to an acquirer.

Embodiment 23 is directed to a computer-implemented method for use in enrolling users in biometric-enabled network interactions, the method comprising: receiving an enrollment packet from a party, the enrollment packet including biometric data associated with a user, one or more controls associated with use of the biometric data and information associated with the party, wherein the biometric data includes one of a biometric template and a biometric hash (e.g., a biometric template, or optionally a biometric hash, etc.); generating, by a computing device, an enrollment record for the enrollment packet, the generated record including at least part of the biometric data, the one or more controls associated with use of the biometric data and the information associated with the party; receiving or generating, by the computing device, a unique biometric ID for the enrollment packet; storing, by the computing device, the generated enrollment record in a repository, and linking the enrollment record to the unique biometric ID; and providing, by the computing device, a confirmation, including the unique biometric ID, back to the party.

Embodiment 24 is the computer-implemented method of Embodiment 23, wherein the party includes a merchant.

Embodiment 25 is the computer-implemented method of Embodiments 23 or 24, wherein the biometric data includes the biometric hash; and wherein the one or more controls include one or more temporal, location and merchant controls.

Embodiment 26 is the computer-implemented method of any one of Embodiments 23-25, further comprising: receiving, by the computing device, a request to identify the user from a different party, the request including a biometric hash and an encrypted biometric template; identifying, by the computing device, the party in the repository based on the biometric hash included in the request; decrypting and re-encrypting the biometric template in function of the identified party; transmitting, by the computing device, a biometric ID request to identify the user to the party, the biometric ID request including the re-encrypted biometric template, thereby permitting the party of identify the user; receiving, by the computing device, the unique biometric ID from the party, thereby indicating a match to the user; and identifying, by the computing device, the user to the different party.

Embodiment 27 is directed to a computer-implemented method for use in biometric-enabled network interactions, the method comprising: receiving, by a computing device, a request to identify a user from a party, the request including a biometric hash and an encrypted biometric template; identifying, by the computing device, another party in a repository of enrolled users based on the biometric hash included in the request; transmitting, by the computing device, a biometric ID request to identify the user to the another party, the biometric ID request including the encrypted biometric template, thereby permitting the another party of identify the user; receiving, by the computing device, the unique biometric ID from the another party, thereby indicating a match to the user; and identifying, by the computing device, the user to the party.

Embodiment 28 is directed to a computer-implemented method for use in enrolling users in biometric-enabled network interactions, the method comprising: receiving an enrollment packet from a mobile device associated with a user, the enrollment packet including biometric data associated with a user, one or more controls associated with use of the biometric data and, optionally, other data such as, for example, a payment account credential for an account issued to the user, wherein the biometric data includes either a biometric template or a biometric hash; generating, by a computing device, an enrollment record for the enrollment packet, the generated record including at least the biometric data, the payment account credential and the one or more controls associated with use of the biometric data; and storing, by the computing device, the generated record in a repository.

Embodiment 29 is the computer-implemented method of Embodiment 28, further comprising: receiving a request for the payment account credential from a merchant, the request including biometric data captured by the merchant; identifying the user, in the repository, based on the biometric data captured by the merchant relative to the biometric data stored in the repository; and providing the payment account credential from the record including the biometric data stored in the repository to the merchant in response to the request.

Embodiment 30 is the computer-implemented method of Embodiments 28 or 29, wherein the biometric data is representative of a facial image or selfie of the user.

Embodiment 31 is the computer-implemented method of any of Embodiments 28-30, wherein the payment account credential includes a primary account number (PAN).

Embodiment 32 is directed to a computer-implemented method for use in biometric-enabled network interactions, the method comprising: receiving a request for a payment account credential from a merchant, the request including biometric data captured by the merchant; identifying a user, in a repository of enrolled users, based on the biometric data captured by the merchant relative to biometric data stored in the repository; and providing the payment account credential from a record including the biometric data stored in the repository to the merchant in response to the request.

Embodiment 33 is directed to a computer-implemented method for use in biometric-enabled network interactions, comprising: receiving, by a computing device, a request to identify the user from a different party, the request including an encrypted biometric template and, optionally, a biometric hash; calculating the biometric hash, if not included in the request; identifying, by the computing device, the party in the repository based on the biometric hash included in the request; decrypting and re-encrypting the biometric template in function of the identified party; transmitting, by the computing device, a request to identify the user to the party, the request including the re-encrypted biometric template, thereby permitting the party of identify the user; receiving, by the computing device, the unique biometric ID from the party, thereby indicating a match to a user; and identifying, by the computing device, the user to the different party by returning the biometric ID to this different party.

Embodiment 34 is directed to a computer-implemented method for use in biometric-enabled network interactions, wherein the method comprises: receiving, at a biometric identity switch (BIS) computing device, from a point-of-sale (POS) terminal of a merchant, a request for an authorization packet for a transaction between the merchant and a user, the request including a biometric of the user; identifying, by the BIS computing device, a biometric provider associated with the biometric; requesting, by the BIS computing device, from the identified biometric provider, a biometric identifier for the user, based on the biometric; receiving, by the BIS computing device, the biometric identifier from the identified biometric provider; determining, by the BIS computing device, the authorization packet for the user based on the biometric identifier; and transmitting, by the BIS computing device, the authorization packet to the POS terminal for use by the POS terminal in compiling an authorization request for the transaction.

Embodiment 35 is the computer-implemented method of Embodiment 34, further comprising, prior to receiving the request for the authorization packet from the POS terminal: receiving, at the BIS computing device, an enrollment packet for the user, the enrollment packet including biometric data associated with the user and one or more controls associated with use of the biometric data; generating, by the BIS computing device, an enrollment record for the enrollment packet, the generated enrollment record including at least part of the biometric data and the one or more controls associated with use of the biometric data; and storing, by the BIS computing device, the generated enrollment record in a repository, and linking the enrollment record to the biometric identifier.

Embodiment 36 is the computer-implemented method of Embodiment 35, wherein the merchant is a first merchant, and wherein receiving the enrollment packet for the user includes receiving the enrollment packet for the user from a second merchant different than the first merchant.

Embodiment 37 is the computer-implemented method of Embodiment 35, wherein receiving the enrollment packet for the user includes receiving the enrollment packet for the user from a mobile device of the user.

Embodiment 38 is the computer-implemented method of Embodiment 35, further comprising applying the one or more controls associated with use of the biometric data prior to determining the authorization packet for the user.

In view of the above, the systems and methods herein may provide functionality to facilitate biometric pay. In particular, the BIS is employed to permit parties/merchants to rely on different biometric readers at party/merchant locations, while still pushing all captured biometrics to the same BIS. The BIS then determines which biometric provider is associated with the party/merchant and/or the reader from which a biometric is provided, in order to determine a biometric identifier of the user. Moreover, the BIS is disposed to interact with the commerce engine in a manner to provide an authorization packet in a form usable by the POS terminal. The POS terminal, via the virtual dongle installed at the POS terminal, is able to compile an authorization request based on the authorization packet provided from the commerce engine, via the BIS. As such, the POS terminal is permitted to offer biometric pay, while relying on standard payment network messaging (e.g., via the acquirer, payment network, etc., via existing operability of the POS terminal, etc.) (i.e., the payment rails), in lieu of the party/merchant being forced to call a remote checkout API (e.g., direct to the payment network and/or the issuer) (i.e., deviate from the payment rails) or integrate with a commerce backend to achieve the same. The systems and method herein thus provide an efficient solution that utilizes, rather than replaces, the existing infrastructure of payment account transactions to implement a new means of initiating the same, i.e., biometrics.

In this way, the present disclosure may provide for a unique combination of features that enable use of conventional POS terminals to facilitate biometric-based transactions. In particular, based on a communication from the POS terminal (including the virtual dongle), the BIS is configured to recognize biometric-enabled transactions, to identify users associated with the requests (potentially, regardless of the particular biometric reader and/or biometric provider, etc.), and to compile an appropriate package of data associated therewith (in an e-commerce format). The BIS and/or the virtual dongle is then further configured to format the packet so that a conventional POS terminal is able to utilize the data (despite being originally associated with a transaction of a type not supported by and/or available to the POS terminal) to initiate an authorization request for the transaction in a format supported by and/or available to the POS terminal (e.g., in a card-present format, even though a card was not presented to the POS terminal to initiate the transaction; etc.). In connection therewith, as part of reformatting the data associated with the packet, the BIS and/or virtual dongle enable new functionality to the POS terminal in the ability to facilitate the authorization request for the biometric-enabled interaction.

Moreover, the systems and methods herein may provide enrollment options for users for biometric pay, either at parties/merchants or at mobile devices associated with the users. In the former, the parties/merchants may coordinate the biometric pay, while relying on the BIS as a repository for the underlying data, controls and consent for the biometric pay. In addition, several parties/merchants may rely on the BIS to enable and/or aid in biometric pay, for single enrollment among multiple parties/merchants and/or when users are not readily identifiable at the parties/merchants. Further, in the later, the users are permitted to enroll for biometric pay, where one enrollment is provided to various parties/merchants (enrolled with the BIS), but without the biometric of the user being store at the parties/merchants.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one or more of the following steps and/or operations: (a) receiving, from a point-of-sale (POS) terminal, a request for an authorization packet for a transaction between a merchant and a user, the request including a biometric of the user; (b) identifying a biometric provider associated with the biometric; (c) requesting, from the identified biometric provider, a biometric identifier for the user, based on the biometric; (d) receiving the biometric identifier from the identified biometric provider; (e) determining the authorization packet for the user based on the biometric identifier; (f) transmitting the authorization packet to the POS terminal; (g) receiving an enrollment packet for the user, the enrollment packet including biometric data associated with the user and one or more controls associated with use of the biometric data; (h) generating an enrollment record for the enrollment packet, the generated enrollment record including at least part of the biometric data and the one or more controls associated with use of the biometric data; (i) storing, by the BIS computing device, the generated enrollment record in a repository, and linking the enrollment record to the biometric identifier; and (j) applying the one or more controls associated with use of the biometric data prior to determining the authorization packet for the user.

As will also be appreciated based on the foregoing specification, the above-described embodiments of the disclosure may be implemented using computer programming or engineering techniques including computer software, firmware, hardware or any combination or subset thereof, wherein the technical effect may be achieved by performing at least one or more of the following steps and/or operations: (a) requesting a payment account credential from a biometric identity switch (BIS) for use in an interaction between a user and a merchant; (b) receiving an authorization packet indicative of an on-line transaction, the authorization packet include the payment account credential; (c) converting the authorization packet into an authorization request for the interaction, the authorization request associated with an in-person transaction; (d) transmitting the authorization request to an acquirer associated with the merchant; (e) in response to the interaction between the user and the merchant and prior to requesting the payment account credential from the BIS, soliciting a biometric from the user; and (f) receiving an authorization reply from an issuer of an account associated with the payment account credential, in response to the authorization request.

As will also be appreciated based on the foregoing specification, the above-described embodiments of the disclosure may be implemented using computer programming or engineering techniques including computer software, firmware, hardware or any combination or subset thereof, wherein the technical effect may be achieved by performing at least one or more of the following steps and/or operations: (a) receiving an enrollment packet from a party, the enrollment packet including biometric data associated with a user, one or more controls associated with use of the biometric data and information associated with the party, wherein the biometric data includes one of a biometric template and a biometric hash; (b) generating an enrollment record for the enrollment packet, the generated record including at least part of the biometric data, the one or more controls associated with use of the biometric data and the information associated with the party; (c) generating a unique biometric ID for the enrollment packet; (d) storing the generated enrollment record in a repository, and linking the enrollment record to the unique biometric ID; (e) providing a confirmation, including the unique biometric ID, back to the party; (f) receiving a request to identify the user from a different party, the request including a biometric hash and an encrypted biometric template; (g) identifying the party in the repository based on the biometric hash included in the request; (h) transmitting a biometric ID request to identify the user to the party, the biometric ID request including the encrypted biometric template, thereby permitting the party of identify the user; (i) receiving the unique biometric ID from the party, thereby indicating a match to the user; and (j) identifying the user to the different party.

As will also be appreciated based on the foregoing specification, the above-described embodiments of the disclosure may be implemented using computer programming or engineering techniques including computer software, firmware, hardware or any combination or subset thereof, wherein the technical effect may be achieved by performing at least one or more of the following steps and/or operations: (a) receiving a request to identify a user from a party, the request including a biometric hash and an encrypted biometric template; (b) identifying another party in a repository of enrolled users based on the biometric hash included in the request; (c) transmitting a biometric ID request to identify the user to the another party, the biometric ID request including the encrypted biometric template, thereby permitting the another party of identify the user; (d) receiving the unique biometric ID from the another party, thereby indicating a match to the user; and (e) identifying the user to the party.

As will also be appreciated based on the foregoing specification, the above-described embodiments of the disclosure may be implemented using computer programming or engineering techniques including computer software, firmware, hardware or any combination or subset thereof, wherein the technical effect may be achieved by performing at least one or more of the following steps and/or operations: (a) receiving an enrollment packet from a mobile device associated with a user, the enrollment packet including biometric data associated with a user, one or more controls associated with use of the biometric data and a payment account credential for an account issued to the user, wherein the biometric data includes a biometric template and/or a biometric hash; (b) generating an enrollment record for the enrollment packet, the generated record including at least the biometric data, the payment account credential and the one or more controls associated with use of the biometric data; (c) storing the generated record in a repository; (d) receiving a request for the payment account credential from a merchant, the request including biometric data captured by the merchant; (e) identifying the user, in the repository, based on the biometric data captured by the merchant relative to the biometric data stored in the repository; and (f) providing the payment account credential from the record including the biometric data stored in the repository to the merchant in response to the request.

As will also be appreciated based on the foregoing specification, the above-described embodiments of the disclosure may be implemented using computer programming or engineering techniques including computer software, firmware, hardware or any combination or subset thereof, wherein the technical effect may be achieved by performing at least one or more of the following steps and/or operations: (a) receiving a request for a payment account credential from a merchant, the request including biometric data captured by the merchant; (b) identifying a user, in a repository of enrolled users, based on the biometric data captured by the merchant relative to biometric data stored in the repository; and (c) providing the payment account credential from a record including the biometric data stored in the repository to the merchant in response to the request.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise.

The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the phrase "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of example embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in biometric-enabled network interactions, the method comprising:

receiving, at a biometric identity switch (BIS) computing device, from a point-of-sale (POS) terminal of a merchant, a request for an authorization packet for a transaction between the merchant and an account of a user, the request including a biometric of the user;

identifying, by the BIS computing device, a biometric provider associated with the biometric;

requesting, by the BIS computing device, from the identified biometric provider, a biometric identifier specific to the user, based on the biometric, whereby the identified biometric provider identifies the biometric identifier based on the biometric;

receiving, by the BIS computing device, the biometric identifier from the identified biometric provider;

converting the biometric identifier to a user identifier, based on a mapping between the biometric identifier and the user identifier, the user identifier including a phone number and/or an email address;

submitting an authorization packet request to a commerce engine computing device, the authorization packet request including the user identifier and details associated with the transaction, whereby the commerce engine computing device identifies a credential specific to the account of the user based on the user identifier, generates a cryptogram specific to the transaction, and returns the authorization packet including the credential specific to the account of the user and the cryptogram specific to the transaction to the BIS computing device;

receiving, by the BIS computing device, from the commerce engine computing device, the authorization packet in response to the authorization packet request; and transmitting, by the BIS computing device, the authorization packet to the POS terminal for use by the POS terminal in compiling an authorization request for the transaction.

2. The computer-implemented method of claim 1, wherein identifying the biometric provider includes:

looking up the biometric provider for the merchant, based on a name and/or an identifier for the merchant included in the request; or identifying a form, format and/or content of the biometric to the biometric provider.

3. The computer-implemented method of claim 2, wherein the request further includes details associated with the transaction and/or the merchant.

4. The computer-implemented method of claim 1, wherein the credential includes a primary account number (PAN) for the account; and wherein the authorization packet further includes an expiration date for the PAN for the account of the user.

5. The computer-implemented method of claim 1, wherein the biometric includes a fingerprint or a facial image of the user.

6. The computer-implemented method of claim 1, further comprising at least partially converting, by the BIS computing device, the authorization packet into a card-based authorization format prior to transmitting the authorization packet to the POS terminal.

7. A system for use in biometric-enabled network interactions, the system comprising:

a biometric identity switch (BIS) computing device configured to:

receive, from a point-of-sale (POS) terminal of a merchant, a request for an authorization packet for a transaction between the merchant and an account of a user, the request including a biometric of the user;

identify a biometric provider associated with the biometric;

request, from the identified biometric provider, a biometric identifier specific to the user, based on the biometric, whereby the identified biometric provider identifies the biometric identifier based on the biometric;

receive the biometric identifier from the identified biometric provider;

convert the biometric identifier to a user identifier, based on a mapping between the biometric identifier and the user identifier, the user identifier including a phone number and/or an email address;

submit an authorization packet request to a commerce engine computing device, the authorization packet request including the user identifier and details associated with the transaction, whereby the commerce engine computing device identifies a credential specific to the account of the user based on the user identifier, generates a cryptogram specific to the transaction, and returns the authorization packet including the credential specific to the account of the user and the cryptogram specific to the transaction;

receive, from the commerce engine computing device, the authorization packet in response to the authorization packet request; and transmit the authorization packet to the POS terminal for use by the POS terminal to compile an authorization request for the transaction.

8. The system of claim 7, wherein the BIS computing device is configured, in order to identify the biometric provider, to look up the biometric provider for the merchant, based on a name and/or an identifier for the merchant included in the request.

9. The system of claim 7, wherein the BIS computing device is configured, in order to identify the biometric provider, to match a form, format and/or content of the biometric to the biometric provider.

* * * * *